United States Patent
Shipman et al.

(10) Patent No.: US 11,649,002 B2
(45) Date of Patent: May 16, 2023

(54) SEAT POST CONTROL SYSTEM

(71) Applicant: SRAM, LLC, Chicago, IL (US)

(72) Inventors: Christopher Shipman, Chicago, IL (US); Brian Jordan, Highland Park, IL (US); Sage Hahn, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 656 days.

(21) Appl. No.: 16/451,391

(22) Filed: Jun. 25, 2019

(65) Prior Publication Data

US 2020/0140029 A1    May 7, 2020

Related U.S. Application Data

(60) Provisional application No. 62/754,702, filed on Nov. 2, 2018.

(51) Int. Cl.
| | | |
|---|---|---|
| *B62J 1/08* | (2006.01) | |
| *B62J 1/06* | (2006.01) | |
| *B62K 19/36* | (2006.01) | |
| *G05B 15/02* | (2006.01) | |
| *G05D 7/06* | (2006.01) | |
| *B62J 45/00* | (2020.01) | |

(52) U.S. Cl.
CPC . *B62J 1/08* (2013.01); *B62J 1/06* (2013.01); *B62K 19/36* (2013.01); *G05B 15/02* (2013.01); *G05D 7/0629* (2013.01); *B62J 45/00* (2020.02); *B62J 2001/085* (2013.01)

(58) Field of Classification Search
CPC .................................................. B62J 2001/085
See application file for complete search history.

(56) References Cited

U.S. PATENT DOCUMENTS

| | | | |
|---|---|---|---|
| 9,422,018 B2 | 8/2016 | Pelot et al. | |
| 9,540,063 B1 * | 1/2017 | Shirai | B62J 1/08 |
| 2006/0289258 A1 | 12/2006 | Fox | |
| 2013/0221713 A1 * | 8/2013 | Pelot | B62K 19/36 297/215.13 |
| 2018/0186419 A1 * | 7/2018 | Shipman | B62K 19/36 |
| 2018/0244330 A1 * | 8/2018 | Shirai | B62J 1/08 |
| 2019/0002050 A1 * | 1/2019 | Shipman | B62J 1/06 |
| 2019/0039669 A1 * | 2/2019 | McAndrews | B62J 1/08 |
| 2019/0061851 A1 * | 2/2019 | Kurokawa | B62J 45/42 |
| 2019/0061852 A1 * | 2/2019 | Shirai | B62K 19/36 |
| 2019/0193800 A1 * | 6/2019 | Hara | B62J 43/30 |
| 2019/0193802 A1 * | 6/2019 | Hara | G08C 17/00 |
| 2019/0233041 A1 * | 8/2019 | Watson | B62J 1/08 |
| 2019/0351966 A1 * | 11/2019 | Shirai | B62J 50/20 |
| 2019/0367114 A1 * | 12/2019 | Winefordner | B62J 1/08 |

(Continued)

FOREIGN PATENT DOCUMENTS

| | | |
|---|---|---|
| CN | 105882801 | 8/2016 |
| CN | 105882807 | 8/2016 |

(Continued)

*Primary Examiner* — Timothy J Brindley

(57) ABSTRACT

A seat post assembly includes a seat post that is electrically adjustable in height. The adjustability may be based on one or more pressures sensed by one or more sensors within the seat post assembly, respectively. The disclosed seat post assembly includes an electronics module. The electronics module may be carried under the seat or saddle and may include a pressure sensor or pressure sensor circuitry.

14 Claims, 25 Drawing Sheets

(56) References Cited

U.S. PATENT DOCUMENTS

| | | | | |
|---|---|---|---|---|
| 2020/0023918 A1* | 1/2020 | Shirai | ............ | F15B 15/16 |
| 2020/0079453 A1* | 3/2020 | Sakagawa | ............ | B62J 1/00 |
| 2021/0403111 A1* | 12/2021 | Chambers | ............ | B62J 1/06 |

FOREIGN PATENT DOCUMENTS

| | | | | |
|---|---|---|---|---|
| CN | 107662674 | | 2/2018 | |
| CN | 108297982 | | 7/2018 | |
| DE | 102019106615 A1 * | 10/2019 | ............ | B62J 1/08 |
| EP | 3081473 | | 3/2019 | |
| EP | 3552941 A1 * | 10/2019 | ............ | B62J 3/00 |
| TW | 201006719 | | 2/2010 | |
| TW | 201713539 | | 4/2017 | |
| TW | 201829239 | | 8/2018 | |
| TW | 201832979 | | 9/2018 | |

* cited by examiner

SEAT POST CONTROL SYSTEM

The present application claims priority to Provisional U.S. Patent Application No. 62/754,702, filed Nov. 2, 2018, the contents of which are incorporated herein in their entirety.

BACKGROUND

Field of the Disclosure

The present disclosure is generally directed to seats for bicycles and, more particularly, to a seat post control system for a bicycle seat.

Introduction

Bicycles are known to have a seat or saddle to support a rider in a seated position. The position of the saddle on most bicycles is adjustable in some manner. The saddle may be adjustable so that a given bicycle may be configured to accommodate different riders of various sizes. The saddle may also be adjustable to allow a given rider to set or reset the saddle position on a specific bicycle to accommodate different riding conditions.

In one example, a bicycle may have a height adjustable seat post assembly. Thus, the height of the saddle may be selectively adjusted relative to a frame of the bicycle. The typical bicycle has a saddle mounted to a post that is mechanically clamped to a tube of the bicycle frame. When the clamp is released, the saddle and post are slidable up and down relative to the tube of the bicycle frame to adjust the height of the saddle. On more recent higher end bicycles, however, the seat post is height adjustable during riding of the bicycle by employing some type of hydraulic assist mechanism. For example, manually actuated hydraulic height adjustable or "dropper" seat posts may use a hydraulic pressure differential within the post and require manual operation to adjust the seat post height. Some products may use ANT+ wireless communication technology allowing the rider to wirelessly adjust the saddle height. Currently available products have a slow reaction time due at least partially to the design of internal fluid flow components of the seat posts.

SUMMARY

In one example, a seat post assembly for a bicycle includes a first tube having a first distal end, and a second tube having a second distal end. The first tube and the second tube are movable relative to one another to establish a distance between the first distal end of the first tube and the second distal end of the second tube along a tube axis. The seat post assembly also includes a first chamber, a second chamber, and a flow path connecting the first chamber and the second chamber. The seat post assembly includes a valve including an isolator. The isolator is configured to move between a closed position closing the flow path and an open position opening the flow path between the first chamber and the second chamber. The relative movement between the first tube and the second tube is prevented when the isolator is in the closed position, and the relative movement between the first tube and the second tube is allowed when the isolator is in the open position. The seat post assembly also includes a pressure sensor configured to measure a pressure of a fluid within the first chamber or the second chamber, and a controller in communication with the pressure sensor and the valve. The controller is configured to control the movement of the isolator between the closed position and the open position based on the measured pressure.

In one example, the seat post assembly further includes a piston separating the second chamber and the third chamber.

In one example, the seat post assembly further includes a third chamber outside of the flow path. An incompressible fluid is disposed within the first chamber and the second chamber, and a compressible gas is disposed within the third chamber. The pressure sensor is configured to measure the pressure of the incompressible fluid within the first chamber or the pressure of the incompressible fluid within the second chamber.

In one example, the compressible gas has a preloaded pressure, such that when the distance between the first distal end of the first tube and the second distal end of the second tube along the tube axis is at a minimum and the isolator is moved from the closed position to the open position, the preloaded pressure causes the relative movement between the first tube and the second tube.

In one example, the seat post assembly further includes a piston cylinder disposed within the first tube. The piston cylinder partially defines the first chamber. At least a portion of the second chamber and at least a portion of the third chamber are disposed within a volume between the piston cylinder and the first tube. The piston separates the second chamber and the third chamber within the volume between the piston cylinder and the first tube.

In one example, the measured pressure is proportional to a load applied along the tube axis when the isolator is in the closed position and is proportional to the distance between the first distal end of the first tube and the second distal end of the second tube along the tube axis when the isolator is in the open position.

In one example, the controller is further configured to identify a target distance between the first distal end of the first tube and the second distal end of the second tube along the tube axis, and determine a target pressure based on the identified target distance. In a first mode, when the measured pressure is greater than the determined target pressure, the controller is further configured to instruct the isolator to move to the open position, read the pressure of the fluid from the pressure sensor until the read pressure is less than or equal to the determined target pressure, and instruct the isolator to move to the closed position when the read pressure is less than or equal to the determined target pressure.

In one example, in a second mode, when the measured pressure is less than the determined target pressure, the controller is further configured to instruct the isolator to move to the open position, read the pressure of the fluid from the pressure sensor at least until the read pressure is greater than or equal to the determined target pressure, and instruct the isolator to move to the closed position when the read pressure is greater than or equal to the determined target pressure.

In one example, when the isolator is in the closed position, the pressure sensor is configured to measure the pressure of the fluid within the first chamber or the second chamber a number of times. For each of the number of times, the controller is further configured to compare the respective measured pressure to a threshold pressure and generate rider data based on the comparison of the respective measured pressure to the threshold pressure. The rider data identifies a rider is on a seat of the seat post assembly.

In one example, the pressure sensor is configured to measure the pressure of the fluid at a number of time points. The controller is further configured to compare a first pressure of the measured pressures of the fluid to a second pressure of the measured pressures of the fluid. The first pressure and the second pressure are measured at first successive time points of the number of time points, respectively. The second pressure is measured after the first pressure. The controller is further configured to instruct the isolator to move to the open position when the second pressure is greater than the first pressure. The controller is further configured to compare a third pressure of the measured pressures of the fluid to a fourth pressure of the measured pressures of the fluid. The third pressure and the fourth pressure are measured at second successive time points of the number of time points, respectively. The fourth pressure is measured after the third pressure and the second pressure. The controller is further configured to instruct the isolator to move to the closed position when the fourth pressure is less than the third pressure.

In one example, the controller is further configured to compare a fifth pressure of the measured pressures of the fluid to a sixth pressure of the measured pressures of the fluid. The fifth pressure and the sixth pressure are measured at third successive time points of the number of time points, respectively. The sixth pressure is measured after the fifth pressure, and the fifth pressure is measured after the fourth pressure. The controller is further configured to instruct the isolator to move to the closed position when the eighth pressure is less than the seventh pressure.

In one example, the seat post assembly further includes a memory in communication with the controller. The memory is configured to store the measured pressures at the first time point, the second time point, the third time point, and the fourth time point, respectively.

In one example, a time period between the first successive time points and the second successive time points is greater than or equal to a predetermined minimum isolator open time period.

In one example, the controller is further configured to enter a mode of operation of the seat post assembly based on a user input. The mode is a ratchet mode that includes the comparison of the first pressure to the second pressure, the instruction of the isolator to move to the open position, the comparison of the third pressure to the fourth pressure, and the instruction of the isolator to move to the closed position when the user input is a first user input. The mode is a standard mode when the user input is a second user input. The standard mode includes the controller being further configured to move the isolator to the open position in response to the second user input.

In one example, the controller is further configured to receive first data identifying the first user input or second data identifying the second user input. The controller is further configured to enter the ratchet mode when the controller receives the first data and enter the standard mode when the controller receives the second data. The first data identifies a user pressing and releasing a user interface, and the second data identifies the user pressing and holding the user interface for at least a predetermined amount of time.

In one example, the pressure sensor is a first pressure sensor. The seat post assembly further includes a second pressure sensor. The second pressure sensor is configured to measure the pressure of the fluid within the third chamber. The measured pressure of the fluid within the third chamber is proportional to the distance between the first distal end of the first tube and the second distal end of the second tube along the tube axis when the isolator is in the open position or when the isolator is in the closed position.

In one example, a seat post for a bicycle includes a first tube and a second tube that are movable relative to one another to establish a height of the seat post along a tube axis. The seat post further includes a valve including an isolator. The isolator is configured to move between a closed position and an open position. The relative movement between the first tube and the second tube is prevented when the isolator is in the closed position, and the relative movement between the first tube and the second tube is allowed when the isolator is in the open position.

In one example, the seat post further includes a first chamber, a second chamber, and a flow path connecting the first chamber and the second chamber. The isolator is configured to close the flow path connecting the first chamber and the second chamber when the isolator is in the closed position. The pressure sensor is configured to measure the pressure of the fluid within the first chamber or the second chamber. The measured pressure is proportional to a load applied along the tube axis when the isolator is in the closed position and is proportional to the height along the tube axis when the isolator is in the open position.

In one example, a method for controlling a height of a seat post of a bicycle includes measuring, by a pressure sensor, a pressure of a fluid within the seat post and comparing, by a processor, the measured pressure to a pressure stored by a memory. The processor controls, based on the comparison, a position of a valve of the seat post between an open position and a closed position. A change in the height of the seat post is prevented when the valve is in the closed position, and the change in the height of the seat post is allowed when the valve is in the open position.

In one example, the method further includes detecting a load on a seat attached to the seat post and the height of the seat post based on the measured pressure.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

A user of a seat post assembly of the prior art may manually or wirelessly adjust the seat post height a number of times until a particular saddle position (e.g., for a particular riding condition) is reached. Depending on the number of seat post height adjustments required to reach the particular saddle position, this may be a long process. Further, over the course of a ride, the seat post height may change (e.g., slip) due to pressure on the saddle by the user.

The disclosed seat post assembly solves or improves upon the above-noted and/or other problems and disadvantages with existing and prior known seat post assemblies. The disclosed seat post assembly provides a seat post that is electrically adjustable in height based on one or more pressures sensed by one or more sensors within the seat post assembly, respectively. The disclosed seat post assembly includes an electronics module that is carried under the seat or saddle and may include a pressure sensor.

Sensing pressures in wet and/or dry volumes of a seat post assembly, as provided with the present embodiments, provides information regarding the state of a seat post and/or a saddle of the seat post assembly. For example, sensing a pressure in a pneumatic volume (e.g., a dry volume) may provide information regarding a relative position of stanchions, consequently providing information regarding a relative extension position of the seat post. In another example, sensing a pressure in a hydraulic volume (e.g., a wet volume) may provide information regarding whether a load is applied to the saddle and/or a saddle attachment portion. In an embodiment, both a load status and a seat post relative position may be determined from a pressure detected by a pressure sensor. For example, in a seat post assembly having nested volumes, measurement of a pressure within one of the nested volumes may provide information regarding both load status and seat post relative position.

The pressure feedback allows for more accurate, repeatable positioning of the saddle relative to the frame of the bicycle, and active control of the positioning of the saddle relative to the frame based on the sensed pressure prevents unwanted changes of the seat post height.

Figure 1:
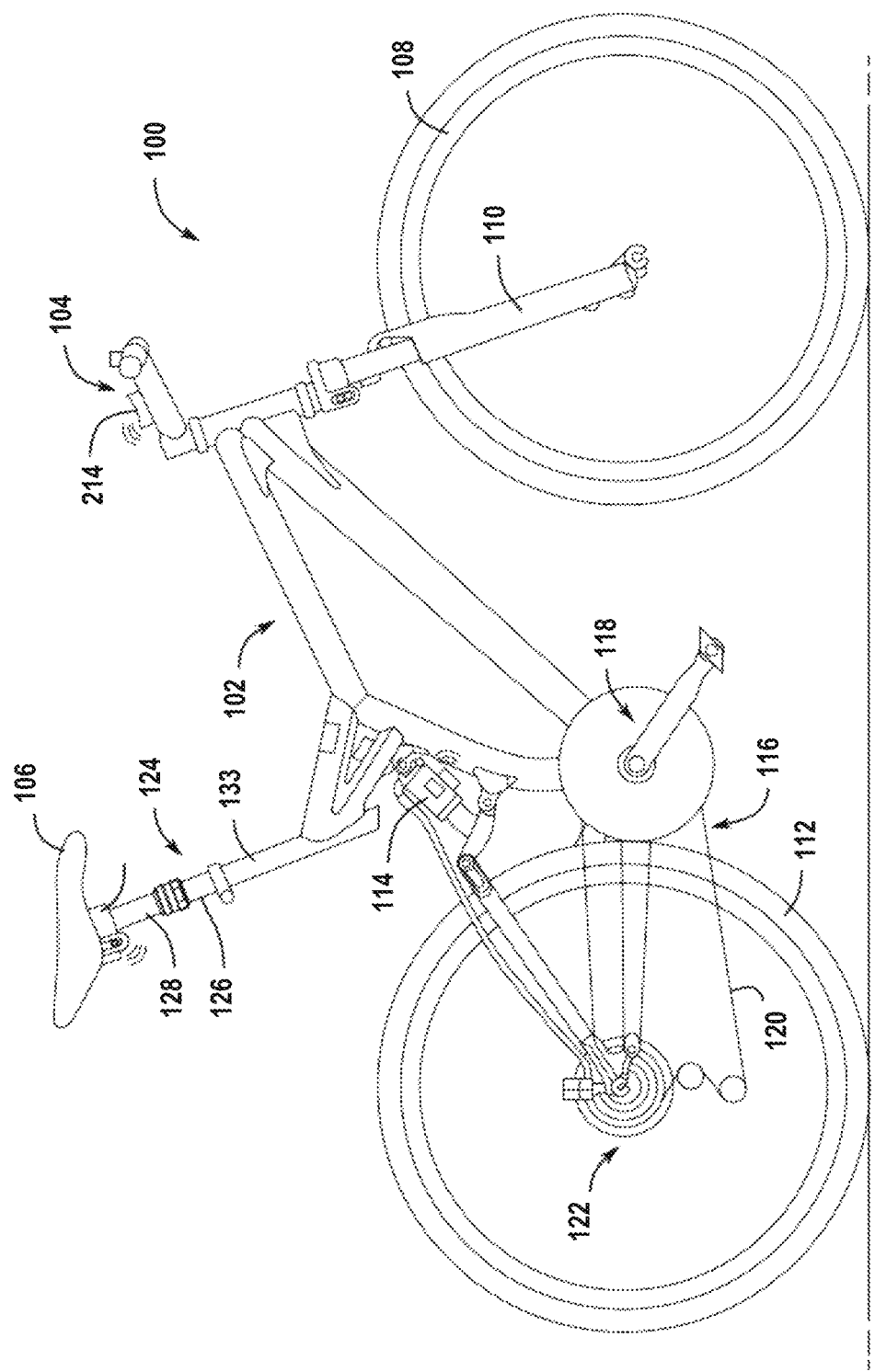
FIG. 1 shows a side view of one example of a bicycle that may be fitted with a seat post assembly constructed in accordance with the teachings of this disclosure.

Turning now to the drawings, FIG. 1 illustrates one example of a human powered vehicle on which the disclosed seat post assembly may be implemented. In this example, the vehicle is one possible type of bicycle 100, such as a mountain bicycle. The bicycle 100 has a frame 102, handlebars 104 near a front end of the frame 102, and a seat or saddle 106 for supporting a rider over a top of the frame 102. The bicycle 100 also has a first or front wheel 108 carried by a front fork 110 of the frame 102 and supporting the front end of the frame 102. The bicycle 100 also has a second or rear wheel 112 supporting a rear end of the frame 102. The rear end of the frame 102 may be supported by a rear suspension component 114. The bicycle 100 also has a drive train 116 with a crank assembly 118 that is operatively coupled via a chain 120 to a rear cassette 122 near a rotation axis of the rear wheel 112. In this example, the saddle 106 is supported on a seat post assembly 124 constructed in accordance with the teachings of the present disclosure.

While the bicycle 100 depicted in FIG. 1 is a mountain bicycle, the seat post assembly 124, including the specific embodiments and examples disclosed herein as well as alternative embodiments and examples, may be implemented on other types of bicycles. For example, the disclosed seat post assembly 124 may be used on road bicycles, as well as bicycles with mechanical (e.g., cable, hydraulic, pneumatic, etc.) and non-mechanical (e.g., wired, wireless) drive systems. The disclosed seat post assembly 124 may also be implemented on other types of two-, three-, and four-wheeled human powered vehicles as well.

Figure 2:
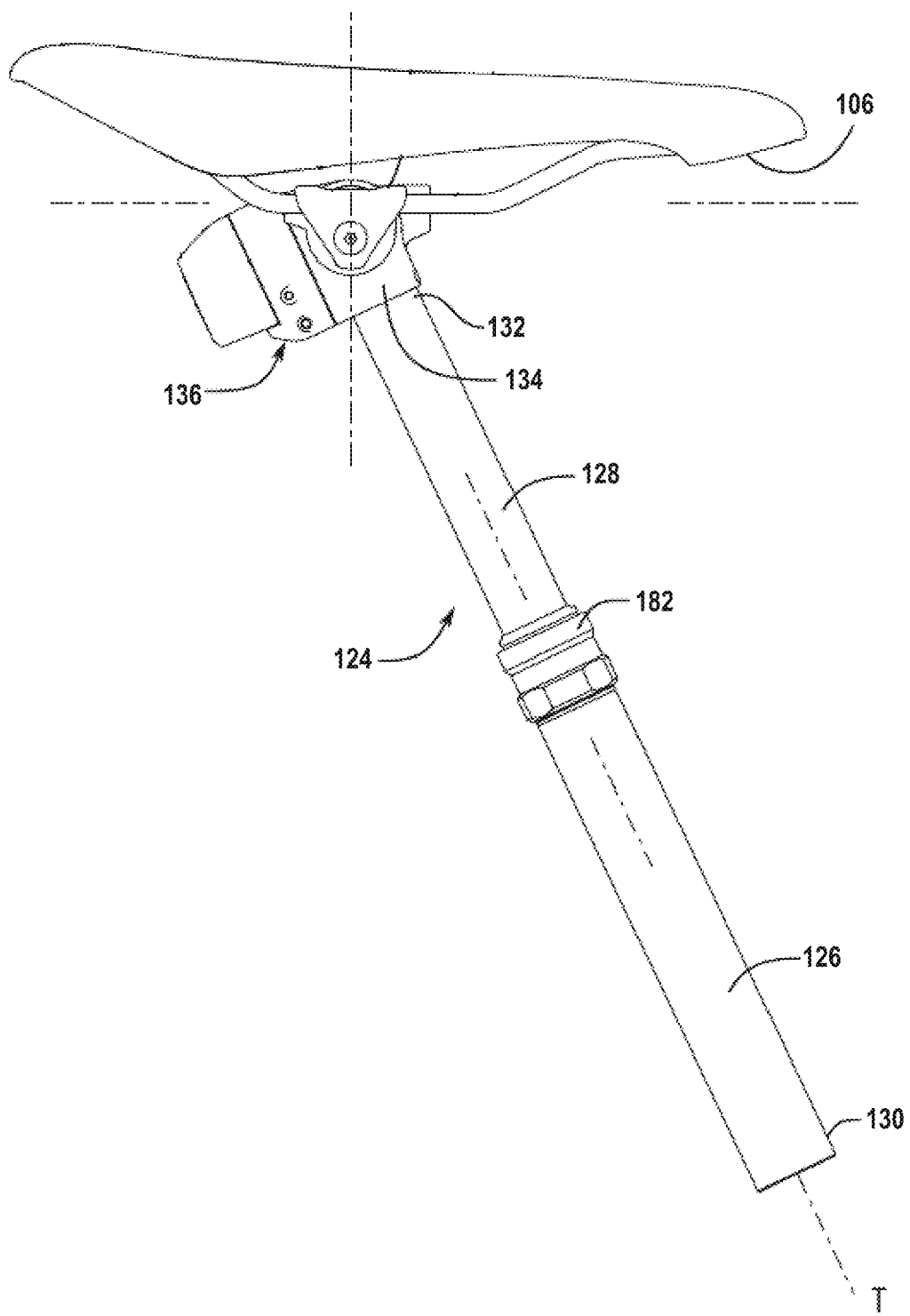
FIG. 2 shows a side view of a seat post assembly, with a saddle installed thereon, and constructed in accordance with the teachings of this disclosure.

With that in mind and referring to FIG. 2, the saddle 106 is attached to and carried on the top of the seat post assembly 124. The disclosed seat post assembly 124 has a first or lower post segment (e.g., a lower tube 126) and a second or upper post segment (e.g., an upper tube 128). The lower tube 126 and the upper tube 128 are movable relative to one another to establish a height of the saddle 106 relative to the frame 102. In this example, the lower tube 126 has a first or lower distal end 130 defining a lower end of the seat post assembly 124. The upper tube 128 has a second or upper distal end 132 defining an upper end of the seat post assembly 124. In one example, the lower distal end 130 may be received in and clamped or otherwise secured in a frame tube 133 (see FIG. 1) of the frame 102 in a conventional manner. Thus, the lower tube 126 may be fixed relative to the frame 102 during use, and the upper tube 128 may be slidably and telescopically received in the lower tube 126. The upper tube 128 may slide telescopically along a tube axis T relative to the lower tube 126 to establish a distance between the second distal end 132 and the first distal end 130, respectively.

A head 134 is fixed to the top of the seat post assembly 124 (e.g., to the second distal end 132 of the upper tube 128). The head 134 is configured to include an electronics module 136, which provides important functions for the seat height adjustment feature of the disclosed seat post assembly 124, as described below. The saddle 106 is mounted to and carried on the head 134 to attach the saddle 106 to the seat post assembly 124. In one embodiment, the head 134 is also configured to provide a saddle clamp mechanism that provides saddle fore-aft and tilt adjustment features.

Figure 3:
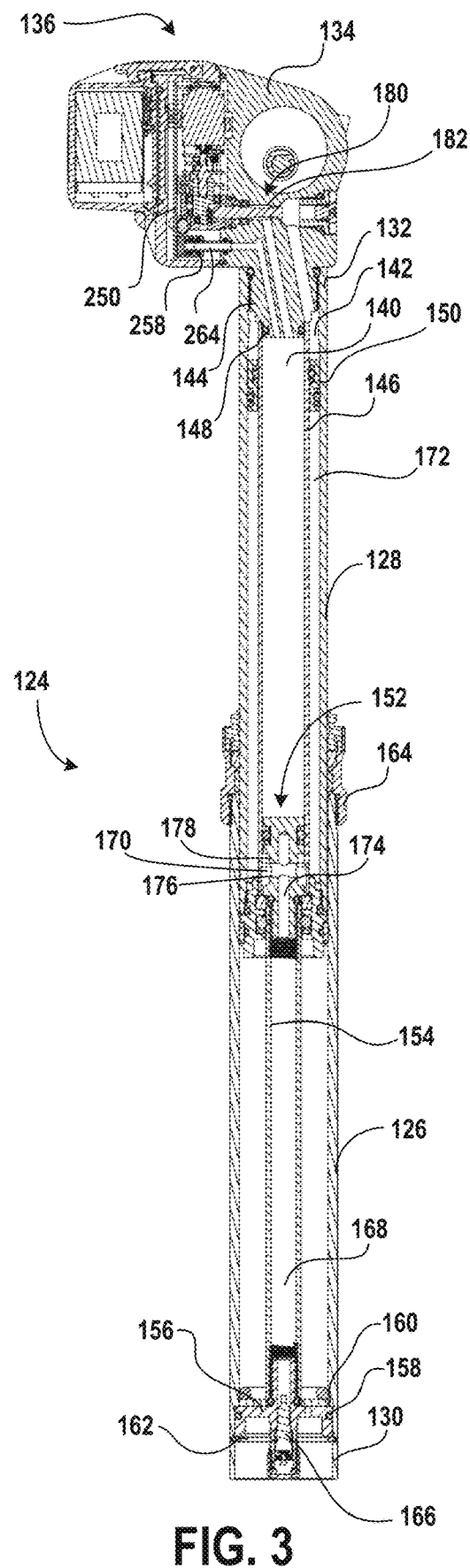
FIG. 3 shows a vertical cross-section view of a first embodiment of a seat post assembly in a fully raised or extended position.
Figure 4:
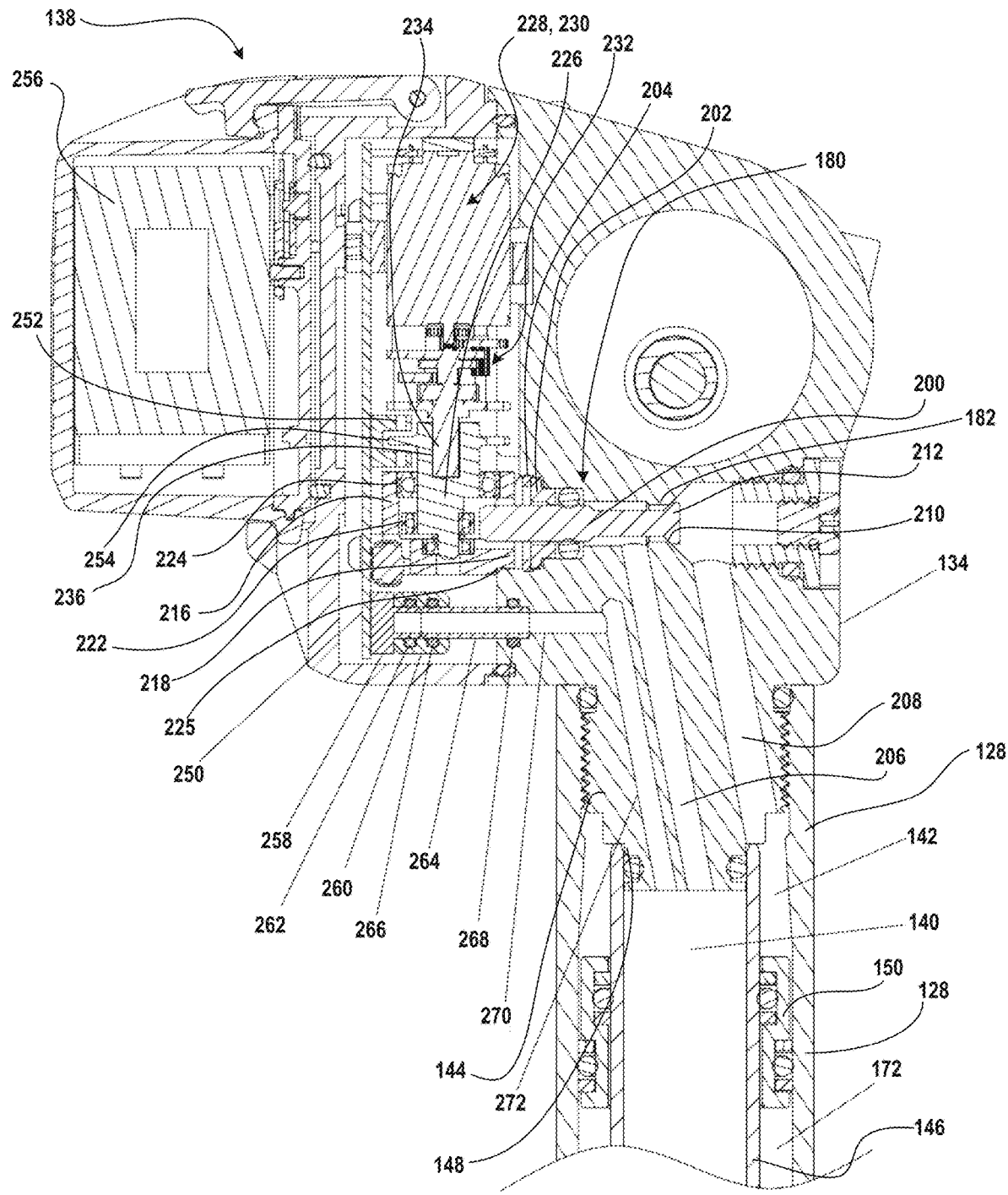
FIG. 4 shows an enlarged close-up view in cross-section of an electronics module including a pressure sensor at an upper end of the seat post assembly of FIG. 3.

Referring to FIGS. 3 and 4, the seat post assembly 124 may be positioned in a fully extended position with the upper tube 128 extended upward relative to the lower tube 126 to a fullest extent. Alternatively, the seat post assembly 124 may be positioned in a fully retracted or contracted position with the upper tube 128 retracted into the lower tube 126 to a fullest extent. Raising or lowering the upper tube 128 relative to the lower tube 126 raises or lowers the seat or saddle 106 relative to the frame 102. The seat post assembly 124 may also be positioned in any number of intermediate positions between the fully extended position and the fully contracted position, according to the desire of the rider.

How the height of the seat post assembly 124 is adjusted is now described below. For the purposes of describing the construction and operation of the seat post assembly 124, the seat post assembly 124 is described by way of two different portions, a hydraulic portion and an electronic portion.

Hydraulic Portion

In general, the hydraulic portion of the seat post assembly 124 has two pressure systems including a hydraulic system and a pneumatic system. An incompressible fluid, such as for example a mineral oil, is contained within the hydraulic system, which includes two hydraulic volumes or pressure chambers. These volumes include a first pressure chamber 140 (e.g., a main fluid volume) and a second pressure chamber 142 (e.g., a fluid volume) defined within the head 134 and the upper tube 128. In order to fully understand and appreciate the first pressure chamber 140 and the second pressure chamber 142, specific details of the head 134 and the upper tube 128 are now described.

The second distal end 132 of the upper tube 128 is threaded onto a first boss 144 that protrudes from the bottom of the head 134. A piston cylinder 146 is attached to the first boss 144 via a second boss 148. The piston cylinder 146 is concentrically disposed within the upper tube 128 and an upper end of the piston cylinder 146 bottoms against the face of the first boss 144.

A floating piston 150 resides in the circumferential space between an inner surface of the upper tube 128 and an outer surface of the piston cylinder 146. The floating piston 150 is ring-shaped and creates a movable seal between the outer surface of the piston cylinder 146 and the inner surface of the upper tube 128. A piston 152 is also received within the interior of the piston cylinder 146 and has a piston head at an upper end. A piston shaft 154 is threadably connected to a stem that protrudes from the piston head on the lower end of the piston 152.

An end cap 156 is threaded into the lower end of the piston shaft 154. The end cap 156 is received in a larger diameter bore 158 in the lower end of the lower tube 126. The bore 158 terminates at a step or shoulder 160, and the end cap 156 butts against the shoulder. The end cap 156 is captured between the shoulder 160 and a retaining ring 162 within the lower end of the lower tube 126 securing the end cap 156 therein.

A collar 164 is threadably connected to the upper end of the lower tube 126 and closely surrounds the upper tube 128. The lower tube 126, the collar 164, the piston 152, the piston shaft 154, and the end cap 156 are essentially fixed relative to one another and thus are constrained to not move relative to each other. Since the lower tube 126 is clamped in the frame tube 133 of the bicycle frame 102, these components will always be in the same fixed position relative to the bicycle frame 102. The head 134, the electronics module 136, the upper tube 128, and the piston cylinder 146 are fixed to one another and thus are constrained to always move together as a unit. These parts telescope vertically within and relative to the lower tube 126 along the tube axis.

The first pressure chamber 140 is a hydraulic volume in the form of a substantially cylindrical volume inside the piston cylinder 146. The first pressure chamber 140 is bounded at one end by the head 134 (e.g., by the exposed end of the second boss 148 and at the other end by the piston 152). The second pressure chamber 142 is also a hydraulic volume in the form of a substantially annular space between the outer surface of the piston cylinder 146 and the inner surface of the upper tube 128. The second pressure chamber 142 is bounded at one end by the floating piston 150 and at the other end by the head 134 (e.g., by an exposed step on the first boss 144).

A compressible fluid or gas, such as air, is contained within the pneumatic system, which includes multiple pneumatic chambers. The pneumatic system in this example is pressurized with air via a valve 166 in the end cap 156 in the lower end of the lower tube 126. In one example, the pneumatic system may initially be pressurized to a preset or established pressure, such as 250 pounds per square inch (psi) with the seat post assembly 124 in the fully extended position shown in FIG. 4. The pneumatic system may be pressurized such that when the seat post assembly 124 is in the fully contracted position and relative movement between the lower tube 126 and the upper tube 128 is allowed, the pressurized pneumatic system causes the upper tube 128 to move relative to the lower tube 126, towards the fully extended position.

The pressurized medium, such as air, is contained within the multiple pneumatic volumes, which include at least volumes 168, 170, 172 (e.g., first through third gas or pneumatic volumes) in this example. The pressurized medium may be added to the pneumatic system such that the first through third pneumatic volumes 168, 170, 172 at a predetermined or preset pressure. As noted below, this preset pressure may then be applied, through interaction between the hydraulic and pneumatic systems, to a part of the hydraulic system.

The first pneumatic volume 168 includes the volume inside the piston shaft 154 and within a longitudinal bore 174 and a transverse bore 176 that communicate with one another and that are each provided within the piston 152. The second pneumatic volume 170 includes the substantially annular volume created by an annular recess 178 that is formed around the circumference of a piston head of the piston 152 and bound between the piston head and the inner surface of the piston cylinder 146. The third pneumatic volume 172 includes the substantially annular volume between the outer surface of the piston cylinder 146 and the inner surface of the upper tube 128. The third pneumatic volume 172 is bounded by the floating piston 150 and the top of the cap ring. The multiple pneumatic volumes may include additional, different, and/or fewer volumes. For example, the multiple pneumatic volumes may include a fourth pneumatic volume that includes the substantially annular volume between the outer surface of the piston shaft 154 and the inner surface of the piston cylinder 146. The fourth pneumatic volume is bounded, for example, by the bottom of the piston head at the upper end of the piston shaft 154 and the top of a stop ring on the cap ring at the lower end of the piston cylinder 146.

Since there are no seals isolating the pneumatic volumes 168, 170, 172 from each other, the pneumatic volumes 168, 170, 172 are all in free communication with each other all the time.

The head 134 and the electronics module 136 together define a valve 180 that includes the hydraulic fluid space within the head. The hydraulic fluid space in this example is defined in part by a bore 182 formed across the head 134. One end of the bore 182 is selectively closed off. Referring to FIG. 4, a valve body or poppet 200 (e.g., an isolator) is received in the bore 182 in the head 134, and a portion of the isolator 200 extends through the opposite end of the bore 182. A bushing 202 is seated in the opposite end of the bore 182 and is secured by a retaining ring 204.

The head 134 in this example includes a first fluid conduit or first passage 206 that extends through the first boss 144 and opens at one end into the bore 182 and opens at the other end into the first pressure chamber 140 at the end of the second boss 148. The first passage 206 provides fluid communication between the bore 182 and the first pressure chamber 140 within the piston cylinder 146 connected to the first boss 144. The head 134 also includes a second fluid conduit or second passage 208 that extends through the first boss 144 adjacent the first passage 206. The second passage 208 opens at one end into the bore 182 and opens at the other end into the second pressure chamber 142 at the end of the first boss 144 but to the side of the second boss 148. The second passage 208 provides fluid communication between the bore 182 and the second pressure chamber 142 in the space between the upper tube 128 and the piston cylinder 146. A flow path is defined at a smaller diameter mid-region within the bore 182. The part of the bore 182 on one side of the flow path is a part of the first pressure chamber 140. The part of the bore 182 on the other side of the flow path is a part of the second pressure chamber 142. A tapered or conical shaped surface 210 (e.g., a valve seat) is formed in the head material within the bore 182 and adjacent the flow path. The valve seat 210 faces the second pressure chamber 142 side of the bore 182. The flow path allows fluid communication between the first pressure chamber 140 and the second pressure chamber 142.

The isolator 200 is configured to selectively isolate the fluid in the first pressure chamber 140 from the fluid in the second pressure chamber 142. The isolator 200 is configured to nullify any resultant force produced by the loaded pressure of the first pressure chamber 140 acting on the isolator 200. The isolator 200 is essentially a cylinder with a first portion having a first diameter and defining a first end of the isolator 200. The isolator 200 has a second portion coupled to the first portion. The second portion has a second diameter that is smaller than the first diameter. The isolator 200 also has a plug 212 on an end of the second portion opposite the first end, whereby the plug 212 defines a second end of the isolator 200.

When the isolator 200 is in a closed position, the plug 212 is borne against the valve seat 210 adjacent the flow path. This closes the flow path and isolates the first pressure chamber 140 and the second pressure chamber 142 from one another. The shape and/or angle of the valve seat 210 and the shape and/or angle of a surface of the plug 212 may complement one another to provide a sufficient fluid tight seal in the closed position. When the isolator 200 is in an open position, the plug 212 is spaced from the valve seat 210. This opens the flow path, allowing fluid communication between the first pressure chamber 140 and the second pressure chamber 142.

The upper tube 128, the piston cylinder 146, and the cap ring are fixed relative to each other and thus are constrained to move together as a unit. Hydraulic system pressure acts on these parts, and exerts a net upward force on the parts. Thus, the head 134, the upper tube 128, the piston cylinder 146, and the cap ring are all biased upward. However, since the hydraulic fluid in the first pressure chamber 140 is incompressible, a downward force on the head 134 pressurizes the fluid but the head is unable to move downward toward the piston 152. Furthermore, when the rider sits on the saddle 106, a force resulting from the weight of the rider is transferred downwards through the saddle 106 to the head 134. Since the fluid in the first pressure chamber 140 is incompressible, the head 134 pressurizes the fluid but the head 134 is unable to move downward towards the piston 152. Thus, the incompressible fluid in the first pressure chamber 140 supports the rider's weight and reacts against the forces created by the weight of the rider sitting on the saddle 106, holding the head 134, and thus the saddle 106 in position. In other words, the first pressure chamber 140 may be said to have a loaded pressure (e.g., under load from the saddle 106 and the fluid pressure itself) that is proportional to a load applied along the tube axis.

Fluid in the first pressure chamber 140 is in communication with the isolator 200 via the first passage 206 in the head 134. Fluid in the first pressure chamber 140 is pressurized either by the rider's weight on the saddle 106, as described below, by a preset pressure, such as a pneumatic preset pressure, also as described below, or by both. Fluid pressure from the first pressure chamber 140 acts on the plug 212 when the isolator 200 is in the closed position.

Although the fluid pressure in the first pressure chamber 140 acts on the isolator 200, the fluid pressure in the first pressure chamber 140 has a net force of equal to or near zero on the isolator 200. An important implication of this is that, although the fluid pressure in the first pressure chamber 140 will vary directly according the weight of the rider applied to the saddle 106 and the downward force that the body of the rider exerts on the saddle 106 while riding, the net forces acting on the isolator 200 are substantially independent of these factors. Thus, the energy and/or forces required to open the valve 180 are largely, if not entirely, independent of rider weight/load.

Fluid (e.g., air pressure in the pneumatic system within the third pneumatic volume 172) acts with upward force through the floating piston 150 to pressurize the hydraulic fluid in the second pressure chamber 142. Hydraulic fluid in the second pressure chamber 142 is in communication with the isolator 200 via the second passage 208 in the head 134. Fluid pressure from the first pressure chamber 140 acts on the circumference or outer perimeter of the plug 212. The net force on the outer perimeter surface of the plug 212 is zero. The net force on an end of the isolator 200 biases the isolator 200 into contact with the valve seat 210, forming a fluid-tight seal. The position of the isolator 200 in FIG. 4 is referred to as an isolated or closed position because the isolator 200 isolates the first pressure chamber 140 and the second pressure chamber 142. In other words, in the closed position, the isolator 200 blocks fluid flow through the flow path between the first and second passages 206, 208 and thus between the first and second pressure chambers 140, 142. When the isolator 200 is in the isolation or closed position of FIG. 4, the valve 180 is closed.

When a rider is not seated on the saddle 106, the balance of forces in the system is such that the fluid pressure in the second pressure chamber 142 is greater than the fluid pressure in the first pressure chamber 140. If the rider actuates the valve 180 (as described below), a portion of the electronics module 136 (also described below) pushes the isolator 200 from the isolation or closed position of FIG. 4 to the open or actuated position. In the open or actuated position, the isolator 200 is positioned such that fluid may flow through the flow path between the first and second passages 206, 208 and thus between the first and second pressure chambers 140, 142. Further, since the fluid pressure in the second pressure chamber 142 is greater than the fluid pressure in the first pressure chamber 140, fluid flows from the second pressure chamber 142 via the second passage 208, through the flow path, to the first pressure chamber 140 via the first passage 206. As hydraulic fluid is forced into the first pressure chamber 140, the head 134 and the upper tube 128, along with all the parts that are fixed to these parts, are pushed upward to accommodate the resulting increase in fluid volume in the first pressure chamber 140. As the head 134 rises, the saddle 106 rises. The rider may choose to allow the saddle 106 and the upper tube 128 to rise to the fully extended position of FIG. 5 or, if desired, may adjust the saddle to a lesser intermediate height.

When the isolator 200 is in the open or actuated position, the valve 180 is open. The balance of forces (e.g., fluid pressures) acting on the isolator 200 will tend to bias the isolator 200 toward the valve seat 210. If, however, the electronics module 136 is still operated to open the valve 180, as described below, the isolator 200 is retained in the open position. When the electronics module 136 is operated accordingly, however, a portion of the electronics module 136 will release the isolator 200. The balance of the fluid forces within the head 134 will then push the isolator 200 toward the valve seat 210 until the isolator 200 is again positioned as shown in FIG. 4 in the closed position against the valve seat 210. With the valve 180 closed, hydraulic fluid is again prevented from flowing via the flow path between the first and second pressure chambers 140, 142. Thus, the head 134 and the saddle 106 will remain in the vertical height position at the instant the valve 180 closed.

When a rider is seated on the saddle 106, the weight of the rider is, as previously described, supported by the incompressible fluid in the first pressure chamber 140. The fluid in the first pressure chamber 140, therefore, becomes highly pressurized by the weight of the rider and exceeds the fluid pressure in the second pressure chamber 142. However, as described above, the zero or near zero net force on the isolator 200 of the valve 180 keeps the isolator 200 in the closed position. If the rider operates the electronics module 136 to actuate the isolator 200, as described in detail below, the isolator 200 moves from the closed position of FIG. 4 to the open position. The isolator 200 moves in this manner by operation of the electronic portion, as described below, of the valve 180 against the fluid pressure in the second pressure chamber 142. Hydraulic fluid then flows from the first pressure chamber 140 via the first passage 206, through the flow path, and into the second pressure chamber 142 via the second passage 208. With less fluid in the first pressure chamber 140, the head 134 and the upper tube 128, and thus the saddle 106, may move downward toward the piston 152, thus lowering the height of the saddle 106. The rider may choose to move the saddle 106 and the upper tube 128 to the fully retracted position or may choose a greater intermediate height. When the rider operates the electronics module 136 accordingly, the isolator 200 may again be released. The balance of forces on the isolator 200 will force the isolator 200 to the closed position with the plug 212 abutting the valve seat 210, as shown in FIG. 4. With the isolator 200 again in the isolation or closed position, hydraulic fluid is prevented from flowing between the first and second pressure chambers 140, 142. The head 134 and upper tube 128 will thus remain in the vertical position attained at the instant the valve 180 closed.

Electronic Portion

The electronic portion of the seat post assembly 124 includes the electronics module 136, which is incorporated as a part of the head 134 and the valve 180. The electronics module 136 is configured to receive wireless signals from a wireless actuator 214 that is mounted to the handlebars 104 (see FIG. 1). The wireless actuator 214 is configured to operate the electronics module 136 to open or close the valve 180. To do so, a transmission signal is initiated by a rider by using an actuator of some type, such as a lever or a button, on the wireless actuator.

The electronics module 136 has a bearing housing 216 that is mounted to the head 134. The bearing housing 216 includes a rear projecting boss 218 that is received within a corresponding bore 225 in the head 134. In this manner, the bearing housing 216 is accurately positioned relative to the head 134. The bearing housing 216 may be fixed to the head 134, such as by using machine screws or the like. A lower ball bearing 222 and an upper ball bearing 224 are pressed into corresponding bores in the bearing housing 216. A rotary cam 226 is supported within the bearing housing 216 by the lower bearing 222 and the upper bearing 224.

The electronics module 136 also includes a gearmotor 228 that has an electric motor 230 and a gearhead 232. In an embodiment, the electric motor 230 is a direct current or DC motor. The gearmotor 228 also has an output shaft 234 projecting from the gearhead 232. The gearhead 232 and output shaft 234 are configured and arranged such that the output shaft 234 rotates slower, but with more torque, than a motor output shaft (not shown) of the motor 230. In one example, the gearmotor 228 may be an off-the-shelf unit, such as a POLOLU ELECTRONICS micro metal 6 volt gearmotor (Pololu Item No. 998). Similar gearmotors are also available from PRECISION MICRODRIVES (London, England) as well as other manufacturers.

The output shaft 234 of the gearmotor 228 may have a D-shaped or other non-round cross section. Likewise, the cam 226 may have a correspondingly shaped hole 236 at a top end of the cam 226. The output shaft 234 is received in the hole 236 so that rotation of the output shaft 234 rotates the cam 226 in concert therewith.

The electronics module 136 may have a printed circuit board (PCB) 250. In one example, the PCB 250 may be secured to the head 134 with one or more connectors (e.g., screws and/or a guide pin). In one embodiment, the PCB 250 is secured to the bearing housing 216 by a screw. Wires or other conductive elements may electrically connect the motor 230 to the PCB 250.

The electronics module 136 may also include an optical position indicator. For example, an optical switch 252, which may be of a known type in the field of electronics, such as, for example, an OMRON switch (part number EE-SX1131). The optical switch 252 may be a component part of the PCB 250. A photo-interrupter 254 may be provided as a part of the cam 226. In this example, the photo-interrupter 254 is a disc on the top end of the cam 226, and the disc is perforated with a series of optical openings or windows spaced around and through the disc. The photo-interrupter 254 may be integrally formed as a part of the cam 226 or may be a separate item attached thereto. In one example, the photo-interrupter 254 is integrally formed as a one-piece unitary structure with the portions of the cam 226. The photo-interrupter 254 is positioned so as to selectively interrupt beams of light emitted from the optical switch 252, depending on the rotational or angular position of the cam 226 about the cam axis.

The PCB 250 may include a pushbutton switch. The pushbutton switch may be an off-the-shelf electrical component, such as a momentary-type electrical switch with a button-type actuation. A button projects from a bore in a cover of the electronics module 136 and is retained by a retaining ring. An O-ring is contained within a gland formed by the outer surface of the button, the cover, and a washer surrounding the button. The washer captures the O-ring against a step surface within the bore. A biasing element, such as a compression spring biases the button outward from the cover. The button and associated parts are configured and arranged such that when the rider presses the button, a distal or interior end of the button contacts and actuates the pushbutton switch. When the rider releases the button, the spring biases the button out of contact with the pushbutton switch, causing the pushbutton switch to turn off.

The electronics module 136 also includes a power supply, such as a battery or battery pack (e.g., see battery 256 in FIGS. 2 and 4) that is attachable to a cover of the electronics module 136 to provide power for the electronics module 136. At least one battery may be provided and sufficient to provide power to components of the PCB 250, the electric motor 230, and other parts of the electronics module 136 as needed. The battery may be a rechargeable battery, such as, for example, a lithium polymer type battery that may produce a fully charged voltage of approximately 7.5 volts. When the battery is attached to the cover of the electronics module 136, electrical contacts or pogo pins of the PCB 250 contact electrical contacts on the battery. Thus, when the battery is attached to the cover of the electronics module 136, electrical contact is made and maintained between the battery and the PCB 250.

A microprocessor (not shown) on the PCB 250 may send a signal to a motor controller (not shown) on the PCB 250, which allows the motor 230 to draw current from the battery. The motor 230, when actuated or instructed, may convert electrical energy from the battery into rotational mechanical energy. When actuated, the motor 230 may then run and transmit power through the gearhead 232 to the output shaft 234. As previously described, the D-shaped output shaft 234 of the gearmotor 228 is mated in the corresponding D-shaped hole 236 of the cam 226. Therefore, the output shaft 234, when driven by the motor 230, rotationally drives the cam 226 about the cam axis. As the cam 226 rotates about a rotational axis, windows and bars between the windows of the photo-interrupter 254 alternately interrupt light beam(s) from the optical switch 252. This allows the microprocessor to detect and determine the resulting electrical pulses generated by the photo-interrupter 254 as the cam 226 rotates.

The wireless actuator 214, which in this example is mounted to the handlebars 104, is configured to send wireless signals to the seat post assembly 124 and, more specifically, to the electronics module 136. While riding with the saddle 106 positioned at any given vertical position, or height, the cam 226 is positioned in the home position, and the valve 180 is closed. When the rider wishes to adjust the vertical position of the saddle 106, the rider may press and hold an actuator or button on the wireless actuator 214 mounted on the handlebars 104 of the bicycle 100. As long as the actuator or button is being pressed and held by the rider, a wireless signal to open the valve 180 may be repeatedly transmitted by the wireless actuator 214, and may be repeatedly received by a receiver, such as an antenna of a radio chip and/or wireless antennae (not shown) on the PCB 250. A signal is transmitted from the radio chip to the microprocessor of the PCB 250, and the microprocessor sends a signal to the motor controller of the PCB 250. The motor controller then allows the motor 230 to draw current from the battery. The motor 230 converts electrical power from the battery into rotational mechanical power, which is transmitted from the motor 230 through the gearhead 232, to be output as rotation of the output shaft 234. As previously described, the D-shaped output shaft 234 of the gearmotor 228 is mated with a correspondingly D-shaped hole 236 of the cam 226. Thus, rotation of the output shaft 234 rotationally drives the cam 226 about the axis C.

As the cam 226 rotates, the photo-interrupter 254 on the cam 226 also rotates therewith, alternately breaking the beam(s) of light emitted by the optical switch 252. The microprocessor of the PCB 250 may count the resulting electrical pulses generated by the optical switch 252. In this manner, the PCB 250 and the microprocessor may determine and/or maintain data representing the rotational position of the cam 226. Since the eccentric surface of the cam 226 is eccentrically positioned relative to the rotational axis of the cam 226, rotation of the cam 226 causes a ball bearing to rotate about and translate relative to the rotational axis of the cam 226. As the cam 226 rotates, the ball bearing comes into contact with the isolator 200. As the cam 226 continues to rotate, the ball bearing forces the isolator 200 from the closed or isolation position shown in FIG. 4 to the open position. In this example, while the ball bearing pushes the isolator 200, sliding is limited between the outer race of the ball bearing and a first end of the isolator 200. In this example, there is also minimal sliding between the inner race of ball bearing and the cam 226. The lack of sliding, which is created by the bearing being carried on the cam 226 and being positioned at the contact point with the isolator 200, eliminates the substantial majority, if not all, sliding friction that would result. This component arrangement greatly reduces the amount of energy required of the battery 360 and gearmotor 228 to open the valve 180.

Once the valve 180 is open, the rider may vertically position the saddle 106 in the manner as previously described, either by putting weight on the saddle 106 to lower the saddle 106, or by removing weight from the saddle 106 to allow the saddle 106 to rise. Once the saddle 106 is in the desired position, the rider may release the actuator or button on the wireless actuator 214 at the handlebars 104. This will send a wireless signal to the PCB 250 to close the valve 180 and move the isolator 200 to the closed position. The wireless signal is received by the radio chip on the PCB 250, is processed by the microprocessor, and then the motor 230 is controlled to rotate the cam 226 to move the ball bearing away from and out of contact with the first end of the isolator 200. This will allow the previously described system fluid pressure to force the isolator 200 to return from the open position to the closed position of FIG. 4. As the cam 226 rotates and nears the above-described home position, the microprocessor may count electrical pulses from the optical switch 252. The microprocessor may then manage the power flow or delivery to the motor 230 using a PID control algorithm such that the motor stops when the cam 226 is in the home position with the valve 180 closed. The saddle 106 then remains in the position it maintained at the time the valve 180 closed.

In one embodiment, the electronics module 136 of the seat post assembly 124 includes a pressure sensor 258 mounted to the printed circuit board 250. The pressure sensor 258 may be used instead of or in addition to the optical switch 252 and the photo-interrupter 254 to identify a position of, for example, the saddle 106 relative to the frame 102. A tubular portion of pressure sensor 258 extends from a face of the pressure sensor 258. A sensor seal 260 is, for example, generally tubular in shape and is located coaxially with the tubular portion of pressure sensor 258. An O-ring 262 is located in an O-ring gland in the sensor seal 260 and seals against an outer diameter of the tubular portion of pressure sensor 258. A connecting tube 264 is located co-axially with the tubular portion of the pressure sensor 258 and is inserted into an end of the sensor seal 260. An O-ring 266 is located in an O-ring gland in the sensor seal 260 and seals against an outer diameter of the connecting tube 264. The connecting tube 264 extends into a cylindrical bore in the head 134. An O-ring 268 is located in an O-ring gland in the cylindrical bore in the head 134, and seals against the outer diameter of the connecting tube 264. A first hole 270 that extends partially through the head 134 is located co-axially with the cylindrical bore in the head 134, and extends to intersect a second hole 272 that extends partially through the head 134. The second hole 272 is in fluid communication with main fluid volume 140 (e.g., the first pressure chamber). Thus, the pressure sensor 258 is in fluid communication with the main fluid volume 140 and is configured to sense the pressure of the fluid in the main fluid volume 140.

Any number of different types of pressure sensors may be used for the pressure sensor 258. For example, the pressure sensor 258 may be a piezoresistive strain gauge, a capacitive pressure sensor, an electromagnetic pressure sensor, a piezoelectric pressure sensor, an optical pressure sensor, a potentiometric pressure sensor, a resonant pressure sensor, a thermal pressure sensor, an ionization pressure sensor, another type of pressure sensor, or any combination thereof.

Figure 5:
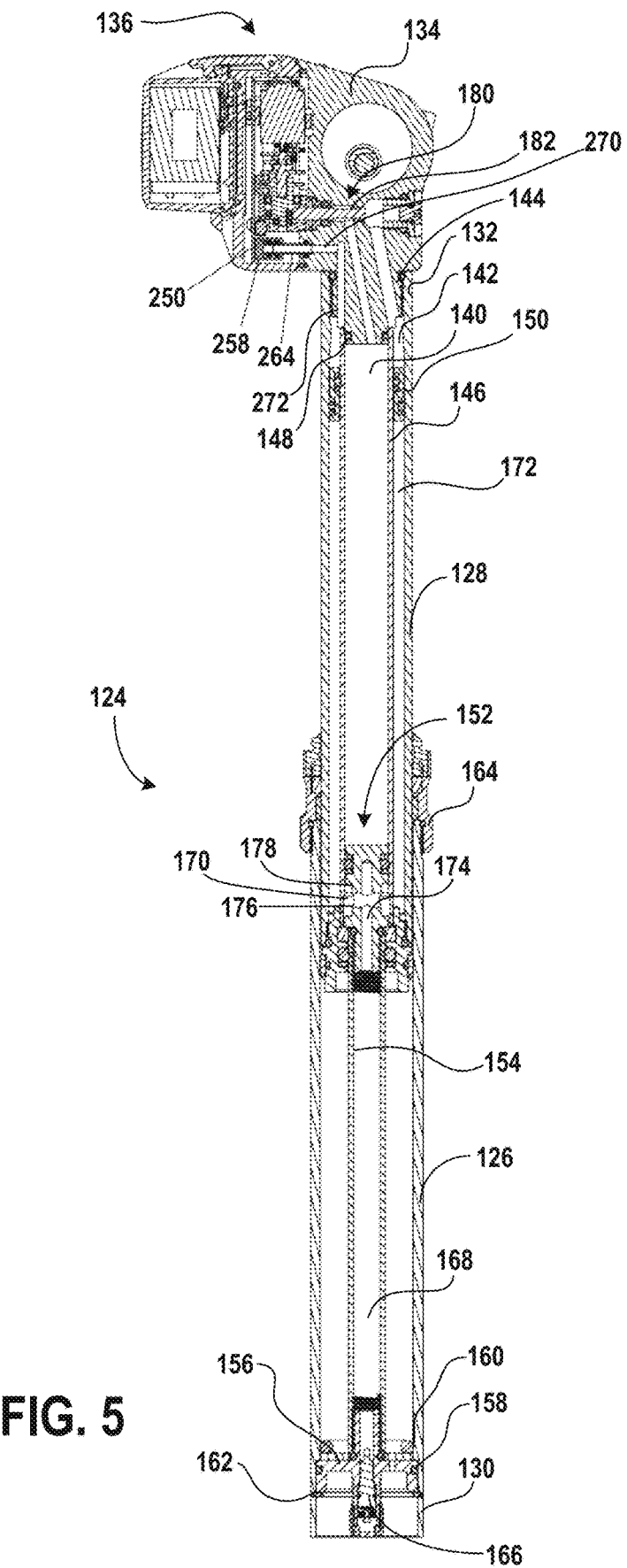
FIG. 5 shows a vertical cross-section view of a second embodiment of a seat post assembly in a fully raised or extended position.
Figure 6:
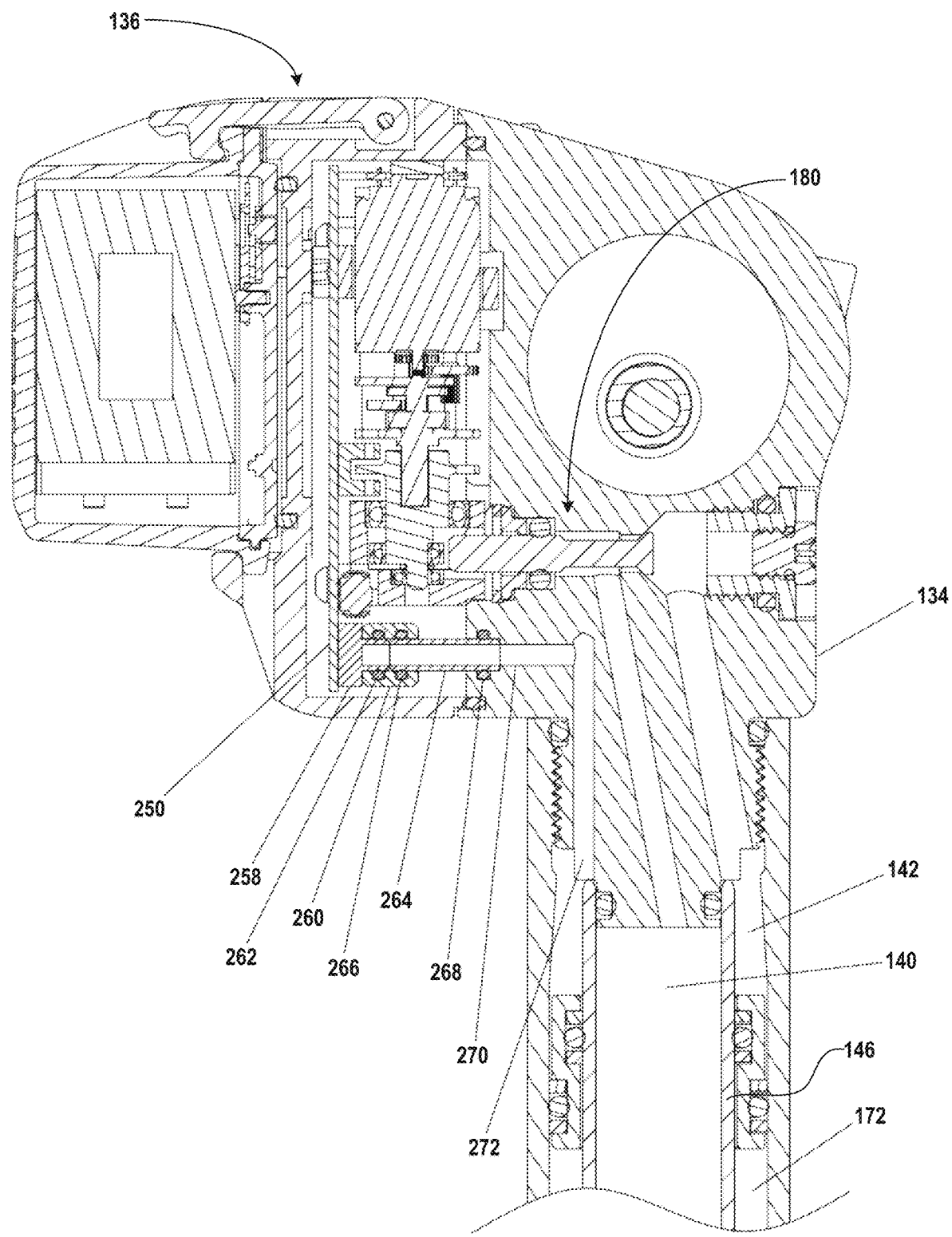
FIG. 6 shows an enlarged close-up view in cross-section of an electronics module including a pressure sensor at an upper end of the seat post assembly of FIG. 5.

In one embodiment, as shown in FIGS. 5 and 6, the pressure sensor 258 mounted to the printed circuit board 250 of the electronics module 136 is configured to sense a pressure of the fluid in the fluid volume 142 (e.g., the second pressure chamber). For example, the second hole 272 extends through the head 134 to connect the first hole 270 through the head 134, and thus the pressure sensor 258, with the second pressure chamber 142. In other words, the second hole 272 of the head 134 is arranged within the head 134 to be in communication with the second pressure chamber 142. When the valve 180 is closed, the second hole 272 through the head 134 is not in communication with the primary fluid volume 140.

In one embodiment, the pressure of the fluid in the fluid volume 142 sensed by the pressure sensor 258 is also related to the pressure of the fluid in the main fluid volume 140 due to, for example, flexing of the piston cylinder 146 when a rider applies a load the saddle 106. Accordingly, the pressure sensor 258 is able to sense the pressure of the fluid in the fluid volume 142 in addition to sensing whether a rider is on the saddle 106 due to changes in the sensed pressure resulting from flexing of the piston cylinder 146 when a load is applied to the saddle 106 and thus the main fluid volume 140.

Figure 7:
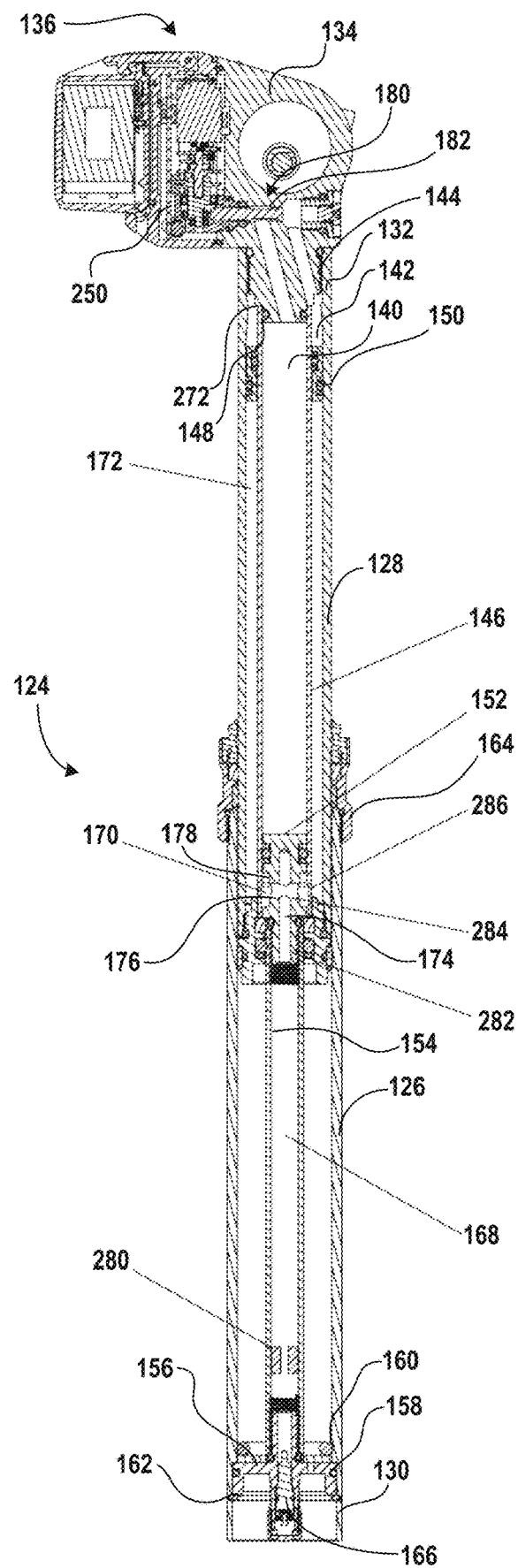
FIG. 7 shows a vertical cross-section view of a third embodiment of a seat post assembly in a fully raised or extended position.
Figure 8:
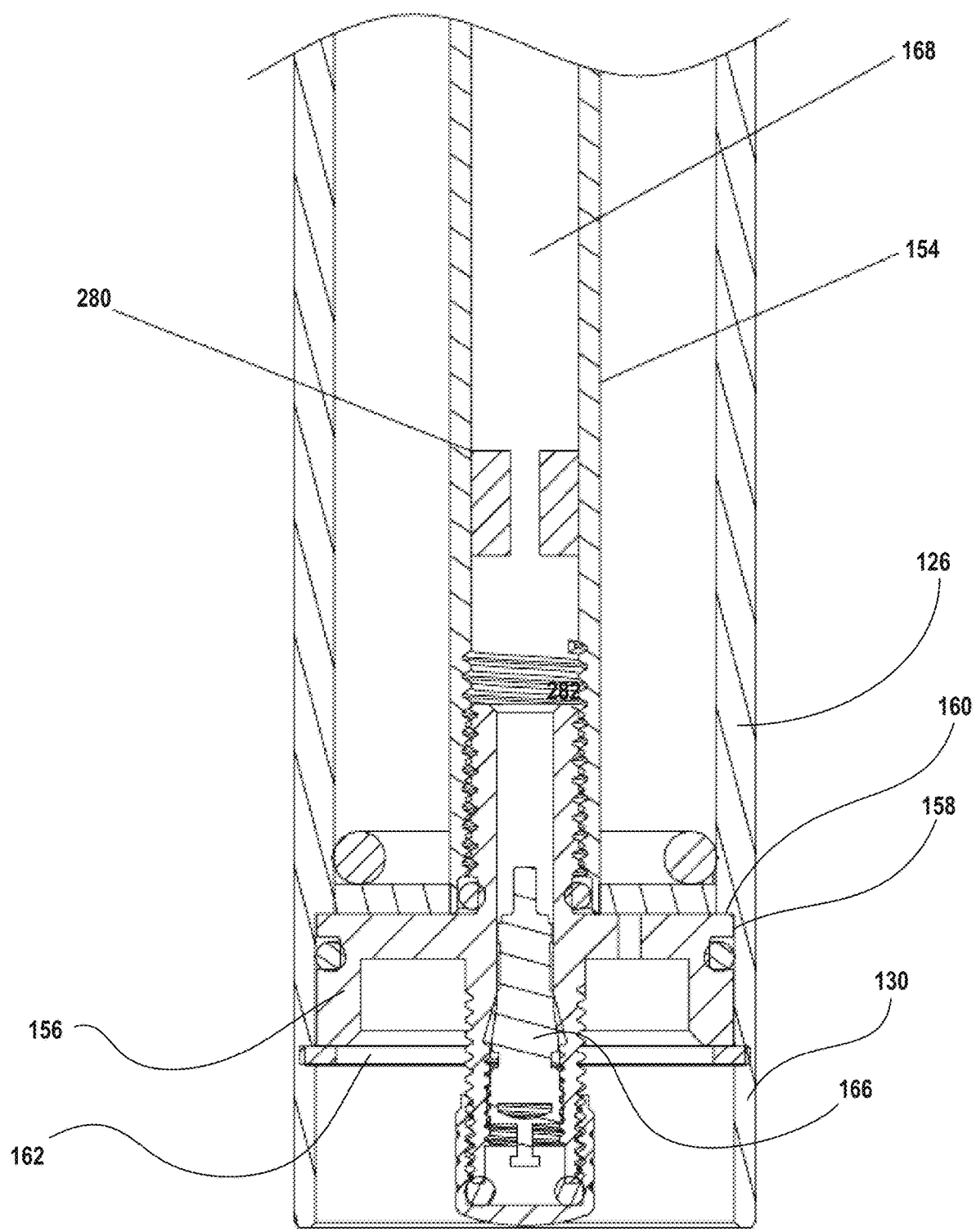
FIG. 8 shows an enlarged close-up view in cross-section of a piston shaft, within which a pressure sensor is positioned, at a lower end of the seat post assembly of FIG. 7.

In another embodiment, as shown in FIGS. 7 and 8, a pressure sensor 280 is located inside the piston shaft 154 and is thus in fluid communication with the gas volume 168. The pressure sensor 280 is configured to sense the pressure of the gas in the gas volume 168. The gas volume 168 is in communication with the gas volume 170 via holes 282 and 284 of the piston 152, and the gas volume 170 is in communication with the gas volume 172 via cross-drilled holes 286 of the piston cylinder 146. Thus, the gas volume 168 is in communication with the gas volume 172, and the pressure sensor 280 may also sense the pressure of the gas in the gas volume 172.

Any number of different types of pressure sensors may be used for the pressure sensor 280. For example, the pressure sensor 258 may be a piezoresistive strain gauge, a capacitive pressure sensor, an electromagnetic pressure sensor, a piezoelectric pressure sensor, an optical pressure sensor, a potentiometric pressure sensor, a resonant pressure sensor, a thermal pressure sensor, an ionization pressure sensor, another type of pressure sensor, or any combination thereof.

Figure 9:
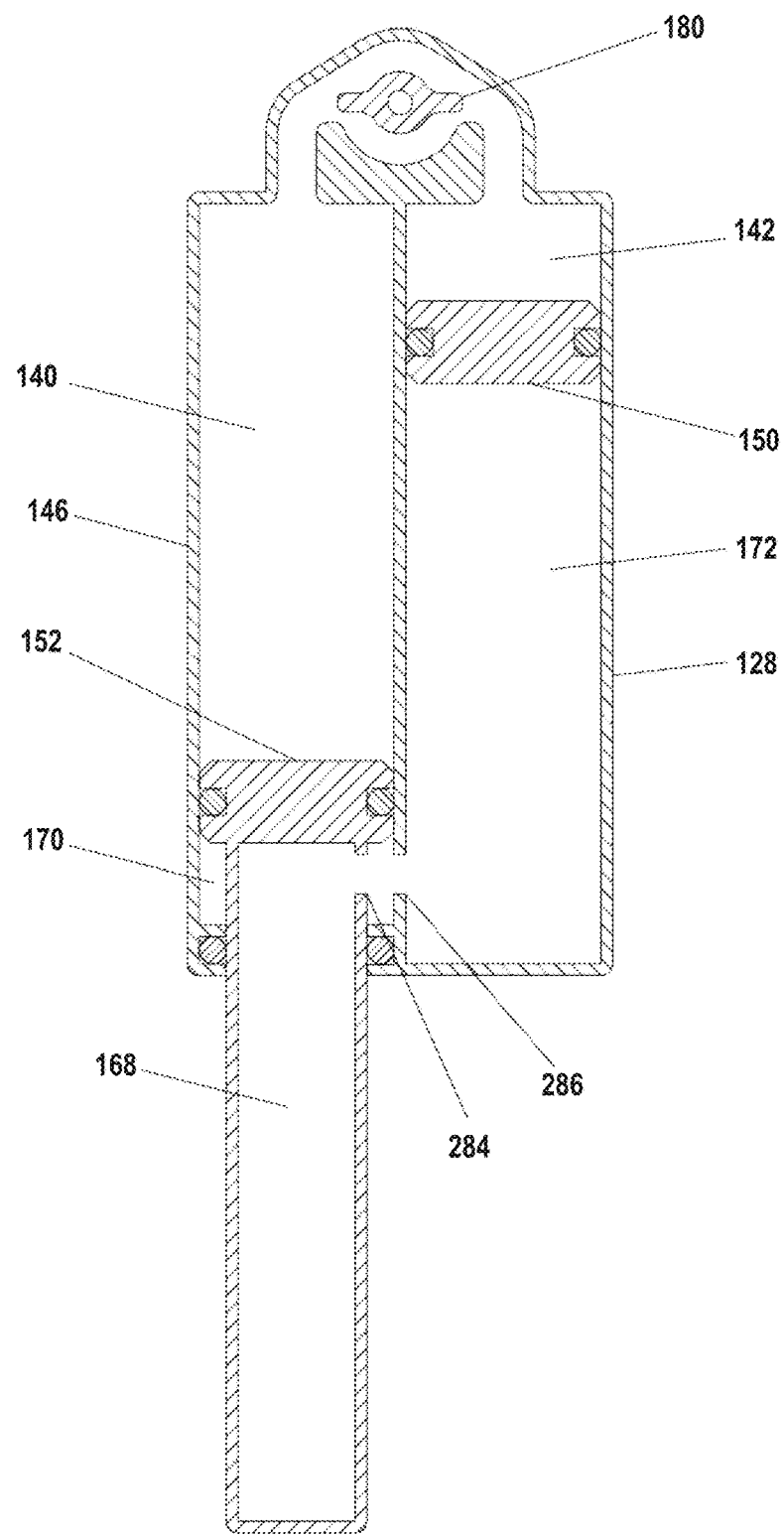
FIG. 9 shows a simplified schematic diagram of a seat post assembly in a raised or extended position.

FIGS. 9-15 show simplified schematic diagrams of different embodiments of the seat post assembly 124, respectively. The diagrams are meant only to illustrate, in a schematic way, how the respectively seat post assemblies 124 work. Referring to FIG. 9, the piston 152 may move up and down in the piston cylinder 146. The piston 152 divides the piston cylinder 146 into the main fluid volume 140 and the gas volume 170. The internal floating piston (IFP) 150 may move up and down in the upper tube 128 (e.g., in the volume between the upper tube 128 and the piston cylinder 146). The IFP 150 divides the volume between the upper tube 128 and the piston cylinder 146 into the fluid volume 142 and the gas volume 172. An interior of the piston 152 is hollow, and the hollow space forms the gas volume 168. The hole 284 in the piston 152 and the hole 286 in the piston cylinder 146 allow the gas volumes 168, 170, 172 to communicate with each other. The main fluid volume 140 and the fluid volume 142 are filled with an incompressible fluid such as, for example, mineral oil, and the gas volumes 168, 170, 172 are filled with a compressible gas such as, for example, air. The valve 180 prevents communication between the fluid volumes 140, 142 when the valve 180 is closed, and allows communication between the fluid volumes 140, 142 when the valve 180 is open.

The positions of the parts shown in FIG. 9 are generally representative of the saddle 106 being in the upper position. In this position, the gas in the gas volume 172 is at a preset pressure P1. Since the IFP 150 is free to move up and down in the upper tube 128, there can be no substantial pressure differential across the IFP 10, and the fluid volumes 142, 140 are therefore also at pressure the preset P1. The entire system pressure, therefore, is at pressure P1.

Figure 10:
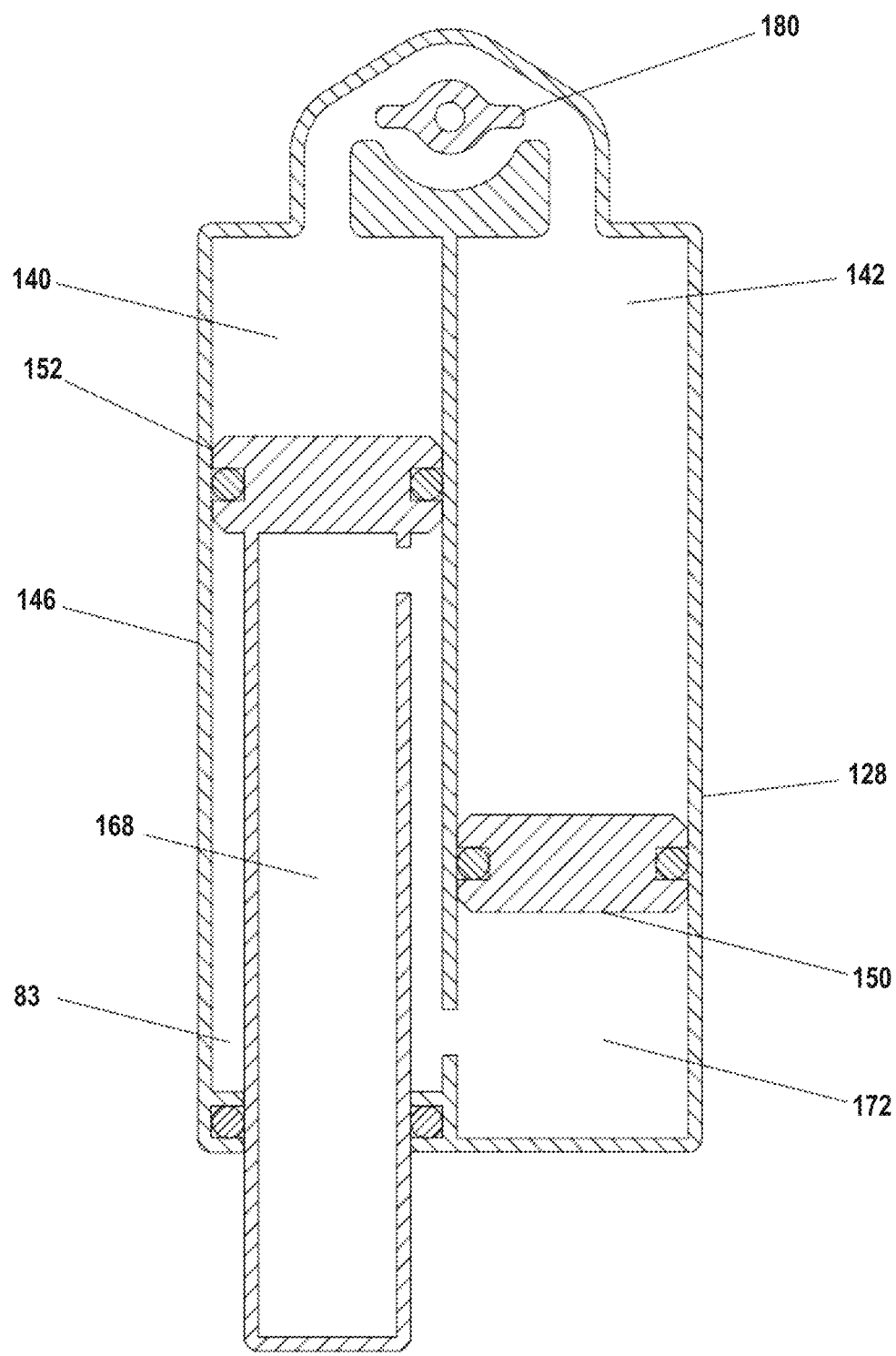
FIG. 10 shows a simplified schematic diagram of a seat post assembly in a lowered or dropped position.

As shown in FIG. 10, as long as the valve 180 is held open, the piston 152 may move further into piston cylinder 146. Since the main fluid volume 140 is now smaller than previously, the displaced mineral oil, for example, is forced to flow through the valve 180 and into the fluid volume 142. This forces the IFP (10) to move down to accommodate the mineral oil, for example, which causes the gas volume 172 to decrease. In this position, a total volume of gas volumes 168, 170, 172 is less than a total volume in the position shown in FIG. 9. Therefore, the gas in the gas volume 172 is now at a higher pressure P2. Since the IFP 150 is free to move up and down in the upper tube 128, there may be no substantial pressure differential across the IFP 10, and the fluid volumes 140, 142 are therefore also at the pressure P2. The entire system pressure, therefore, is at the pressure P2. The positions of the parts shown in FIG. 10 are generally representative of the saddle 106 being in the lower position.

The system pressure is directly related to the position of the saddle. A higher saddle position (shown in FIG. 9) has a lower system pressure, and a lower saddle position (shown in FIG. 10) has a higher system pressure. A pressure sensor anywhere in the system may be used to measure system pressure, and this system pressure may be used to determine saddle height.

Figure 11:
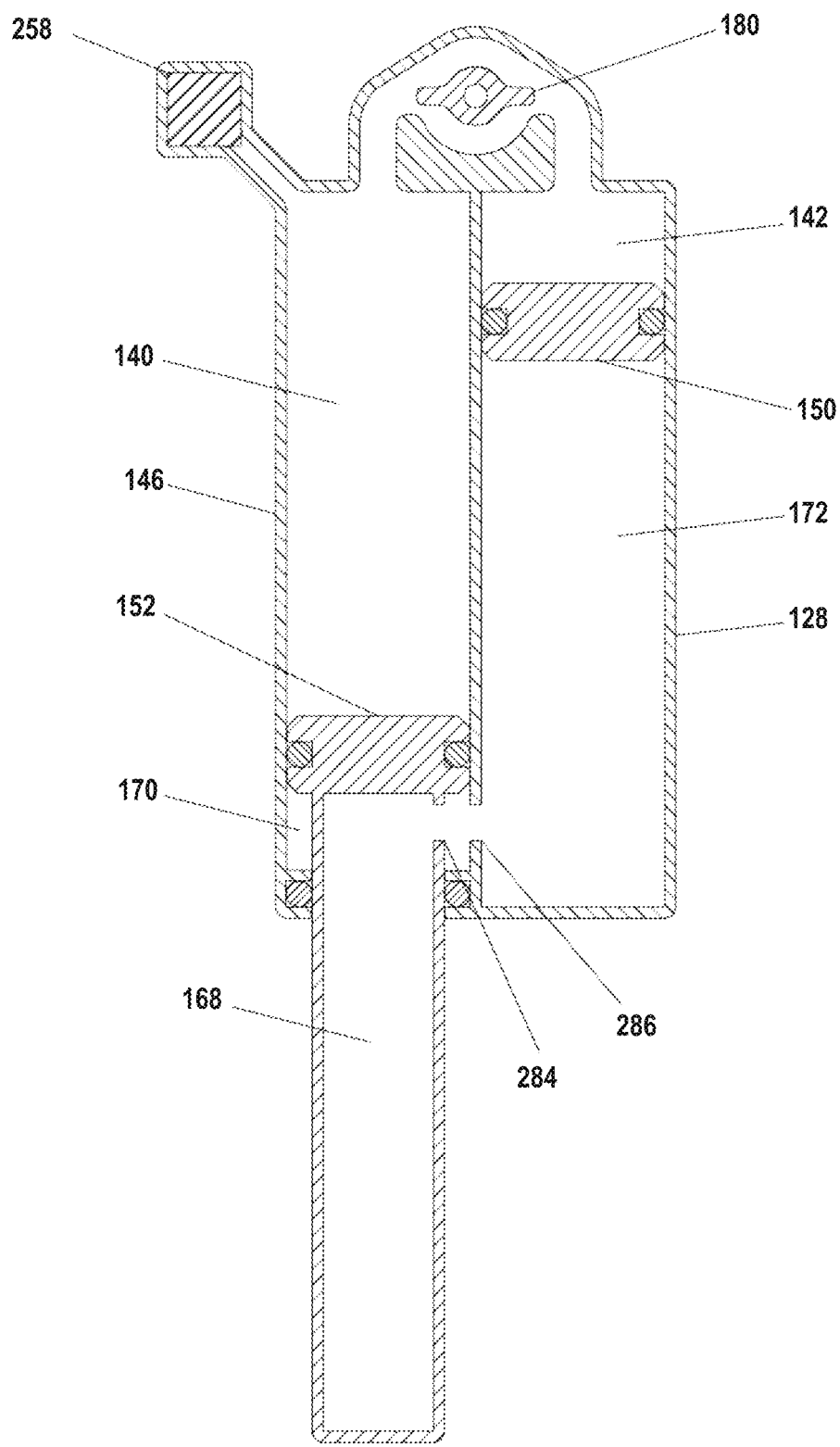
FIG. 11 shows a simplified schematic diagram of the seat post assembly of FIG. 3 in a raised or extended position, with a valve in an open position.
Figure 12:
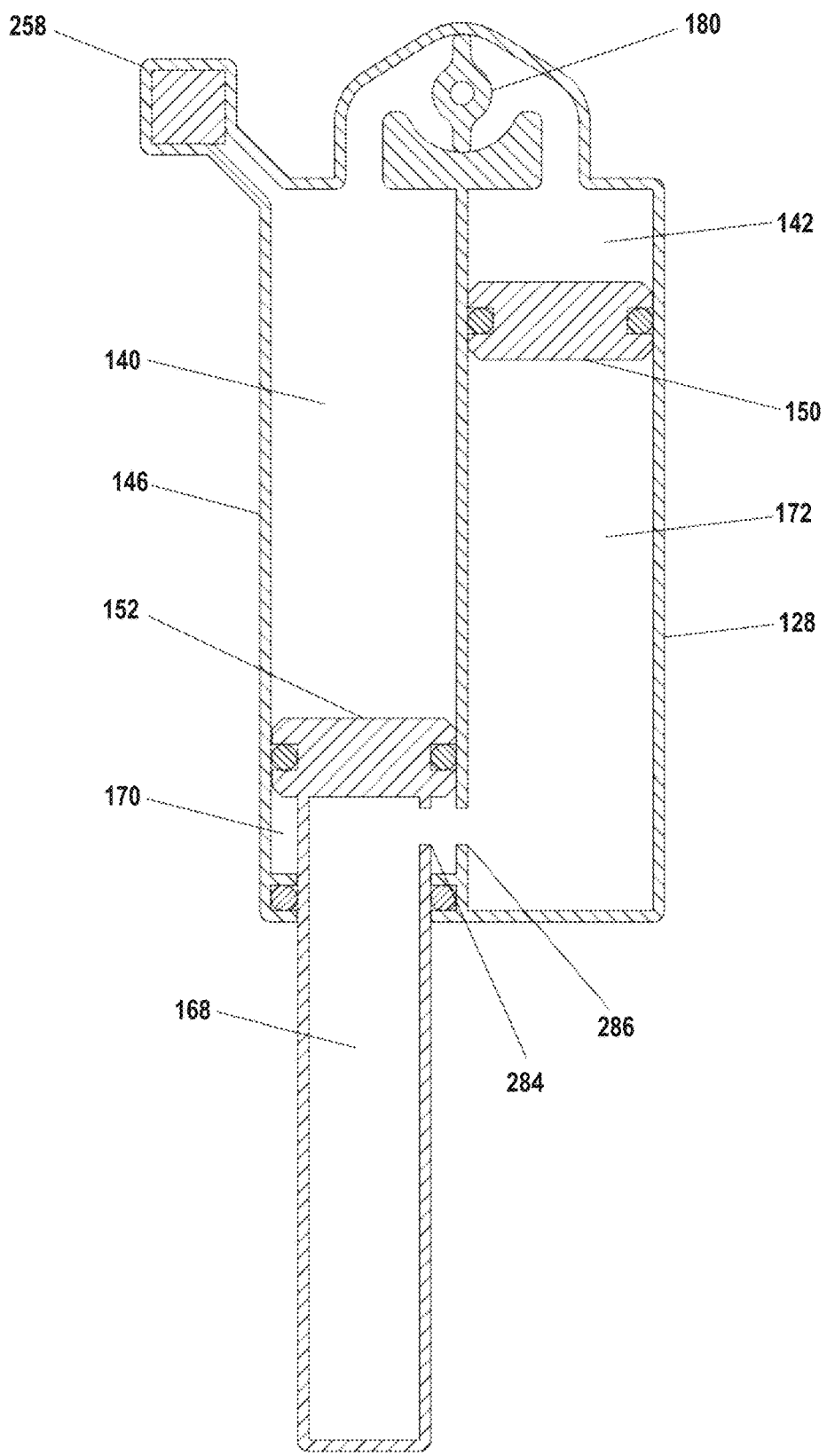
FIG. 12 shows a simplified schematic diagram of the seat post assembly of FIG. 3 in a raised or extended position, with the valve in a closed position.

FIGS. 11 and 12 show the location of the pressure sensor 258 in the embodiment of FIGS. 3 and 4. When the valve 180 is open, as shown in FIG. 11, the pressure sensor 258 measures the system pressure, which, as previously described, may be used to determine saddle height. When the valve 180 is closed, as shown in FIG. 12, the saddle 106 is prevented from moving downwards, and the pressure in the main fluid volume 140 is directly related to any weight that the body of the rider exerts on the saddle 106. As the weight exerted by the body of the rider on the saddle 106 increases, the pressure in the main fluid volume 140 also increases. In this way, the pressure measured by the pressure sensor 258 when the valve 180 is closed may be used to determine whether the rider is sitting on the saddle 106. Further, the pressure measured by the pressure sensor 258 may also be used to determine how much weight the rider is putting on the saddle 106.

Figure 13:
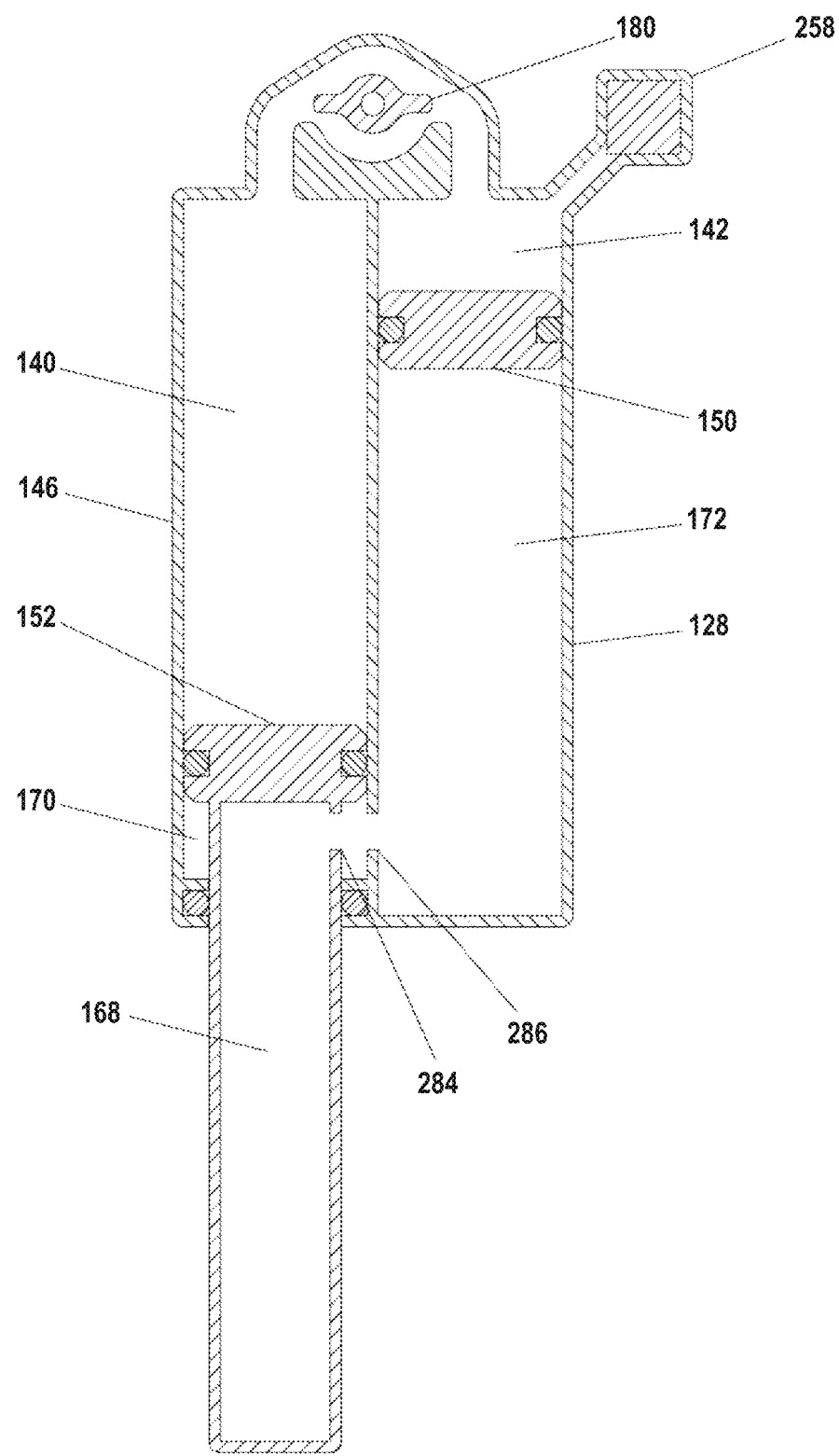
FIG. 13 shows a simplified schematic diagram of the seat post assembly of FIG. 5 in a raised or extended position, with a valve in an open position.

FIG. 13 shows the location of the pressure sensor 258 as described with reference to the embodiment of FIGS. 5 and 6. In this embodiment, the pressure sensor 258 measures the pressure in the fluid volume 142. Whether the valve 180 is open or closed, the pressure sensor 258 measures a pressure that is directly related to saddle height.

In one embodiment, when the pressure in the main fluid volume 140 increases due to a load applied by a rider on the saddle 106, the pressure in the fluid volume 142 may also increase due to, for example, outward flexing of a wall of the piston cylinder 146, which partially forms the main fluid volume 140. The outward flexing of the wall of the piston cylinder 146 decrease a volume of the fluid volume 142 and thus, increases the pressure within the fluid volume 142. Accordingly, when the valve 180 is open or closed, the pressure sensor 258 measures the system pressure, which, as previously described, may be used to determine saddle height. When the valve 180 is closed, the saddle 106 is prevented from moving downwards, and an increase in pressure in the fluid volume 142 (e.g., from the outward flexing of the piston cylinder 146) is directly related to an increase in pressure in the main fluid volume 140 and thus, to any weight that the body of the rider exerts on the saddle 106. The pressure measured by the pressure sensor 258 when the valve 180 is closed may be used to determine whether the rider is sitting on the saddle 106. Further, the pressure measured by the pressure sensor 258 may also be used to determine how much weight the rider is putting on the saddle 106.

Figure 14:
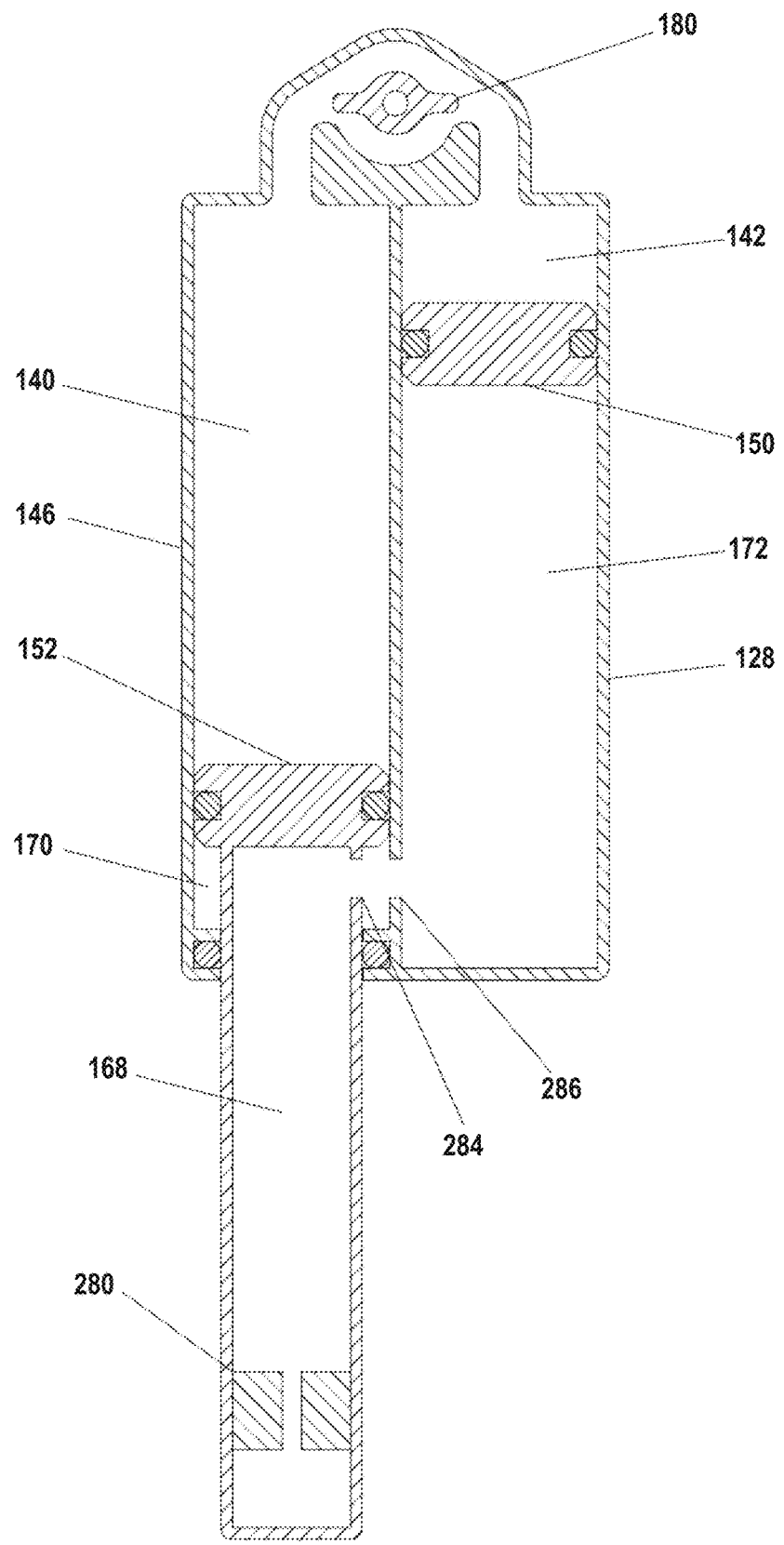
FIG. 14 shows a simplified schematic diagram of the seat post assembly of FIG. 7 in a raised or extended position, with a valve in an open position.

FIG. 14 shows the location of the pressure sensor 280, as described with reference to the embodiment of FIGS. 7 and 8. In this embodiment, the pressure sensor 280 measures air pressure directly. Whether the valve 180 is open or closed, the pressure sensor, when positioned as shown, measures a pressure that is directly related to saddle height.

Figure 15:
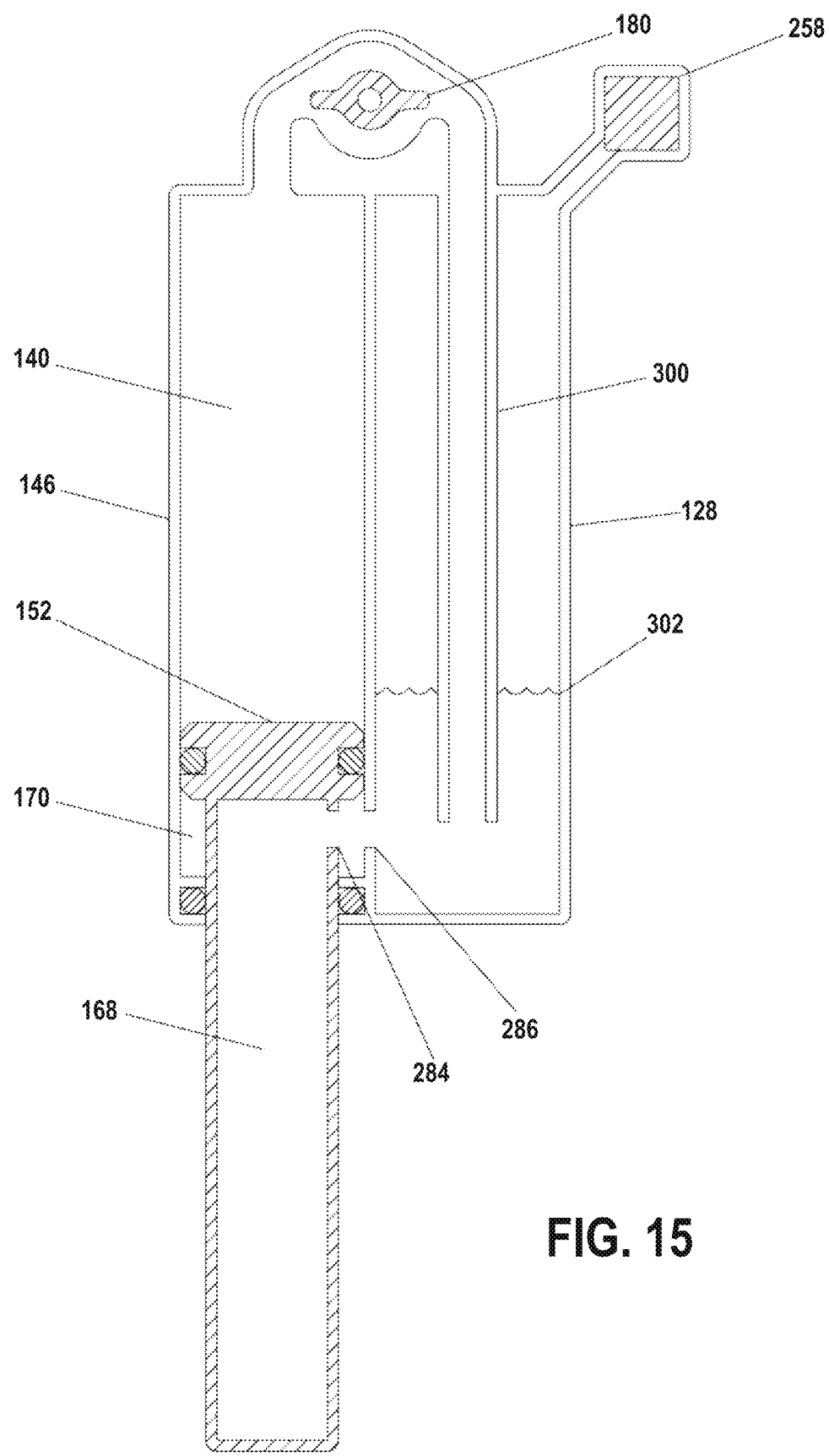
FIG. 15 shows a simplified schematic diagram of a fourth embodiment of a seat post assembly in a raised or extended position, with a valve in an open position.

FIG. 15 shows a fourth embodiment in which a tube 300 extends from the valve 180 into the volume between the upper tube 128 and the piston cylinder 146. In this embodiment, there is no IFP 150 separating the oil, for example, from the air. In this embodiment, the volume 168 and the volume 170 are filled with oil, for example. The volume between the piston cylinder 146 and the upper tube 128 is filled with oil up to an oil level line 302, and is filled with air above the oil level line 302. The main fluid volume 140 is filled with oil, for example. The pressure sensor 258, which is positioned as in the embodiment shown in FIGS. 5 and 6, measures the system air pressure directly and may therefore be used to determine saddle height regardless of whether the valve 180 is open or closed.

The seat post assembly 124 may include one or more of the sensors 258, 280 described above. In one embodiment, the seat post assembly 124 includes the sensor 258 of the embodiment shown in FIGS. 3 and 4, the sensor 258 of the embodiment shown in FIGS. 5 and 6, and the sensor 280 shown in FIGS. 7 and 8. The microprocessor of the PCB 250 may use the pressure measurements in any number of ways to control positioning of the saddle 106 relative to the frame 102.

Figure 16:
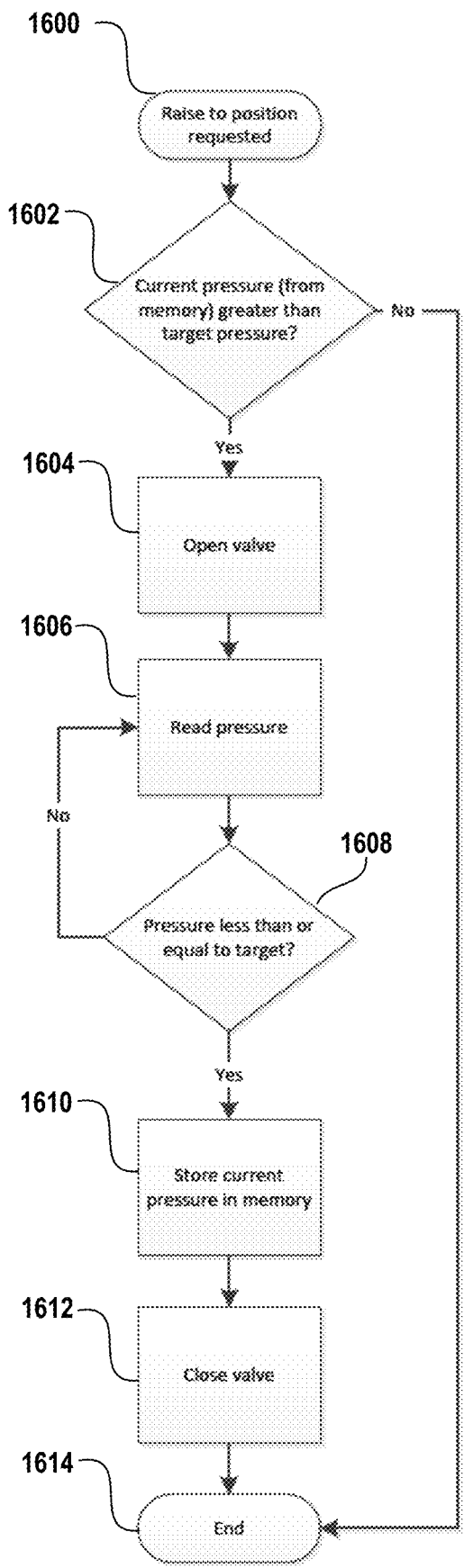
FIG. 16 is a flowchart of an embodiment of a method for raising the saddle of the seat post assembly of FIG. 3 to a predetermined position.

FIG. 16 shows a flowchart of one embodiment of a method for raising a saddle of a bicycle (e.g., the saddle 106 of the bicycle 100). The method may be performed using the seat post assembly 124 shown in FIGS. 3 and 4 or another seat post assembly 124. The method is implemented in the order shown, but other orders may be used. Additional, different, or fewer acts may be provided. Similar methods may be used for raising a saddle of a bicycle.

The seat post assembly 124 may enter a mode in which a valve (e.g., the valve 180 opens and remains open until the seat post is extended such that pressure equals or is less than a pressure corresponding to a predetermined position (e.g., a raise to position mode). The predetermined position is typically between a maximum extended position and a minimum extended position. The mode is entered by, for example, a rider or a user selecting the mode via a user interface at a bicycle (e.g., by raising a saddle height at the user interface). The minimum extended position corresponds to a first pressure, and the maximum extended position corresponds to a second pressure. The first pressure is greater than the second pressure. The user interacts with the user interface (e.g., one or more buttons) to select a position of a saddle of the bicycle. The user may interact with a button of the user interface to raise the saddle a predetermined amount (e.g., corresponding to a predetermined pressure change) and/or to select a predetermined saddle height that is, for example, stored in a memory of an electronics module of the seat assembly (e.g., corresponding to a predetermined pressure).

The user interface may generate a signal (e.g., a request) corresponding to a requested saddle height based on the user interaction with the user interface. The user interface sends the request to a processor of the electronics module via a wired connection and/or a wireless connection. In act 1600, the processor receives the request for the saddle height. The processor determines a pressure (e.g., a target pressure) that corresponds to the requested saddle height. For example, the memory stores data (e.g., a chart) representing a number of predetermined seat heights and pressures that correspond to the predetermined seat heights, respectively. In one embodiment, if the requested saddle height does not exactly match one of the predetermined seat heights stored in the memory, the processor may determine the pressure corresponding to the requested saddle height by interpolating the data stored in the memory.

In act 1602, the processor identifies a current pressure (e.g., at a first time point) and compares the identified current pressure to the target pressure. The processor identifies the current pressure from the pressure sensor of the electronics module or the pressure sensor sends pressure measurements to the memory, and the processor identifies the current pressure from the memory. In one embodiment, the pressure sensor determines the pressure at a predetermined interval or determines the pressure continuously.

Based on the comparison, if the current pressure is greater than the target pressure, the method moves to act 1604. If the current pressure is not greater than the target pressure (e.g., is less than or equal to the target pressure), the method moves to the end of the method at act 1614.

In act 1604, the processor instructs a valve (e.g., the valve 180) of the seat post assembly to open, and in act 1606, the processor again identifies the current pressure (e.g., updates the current pressure at a second time point). In act 1608, the processor compares the updated current pressure to the target pressure. If the updated current pressure is less than the target pressure, the method moves to act 1610. If the updated current pressure is not less than the target pressure (e.g., is greater than or equal to the target pressure), then the method returns to act 1606.

In act 1610, the updated current pressure is stored in the memory, and in act 1612, the processor instructs the valve (e.g., the valve 180) to close. The method ends at act 1614.

Figure 17:
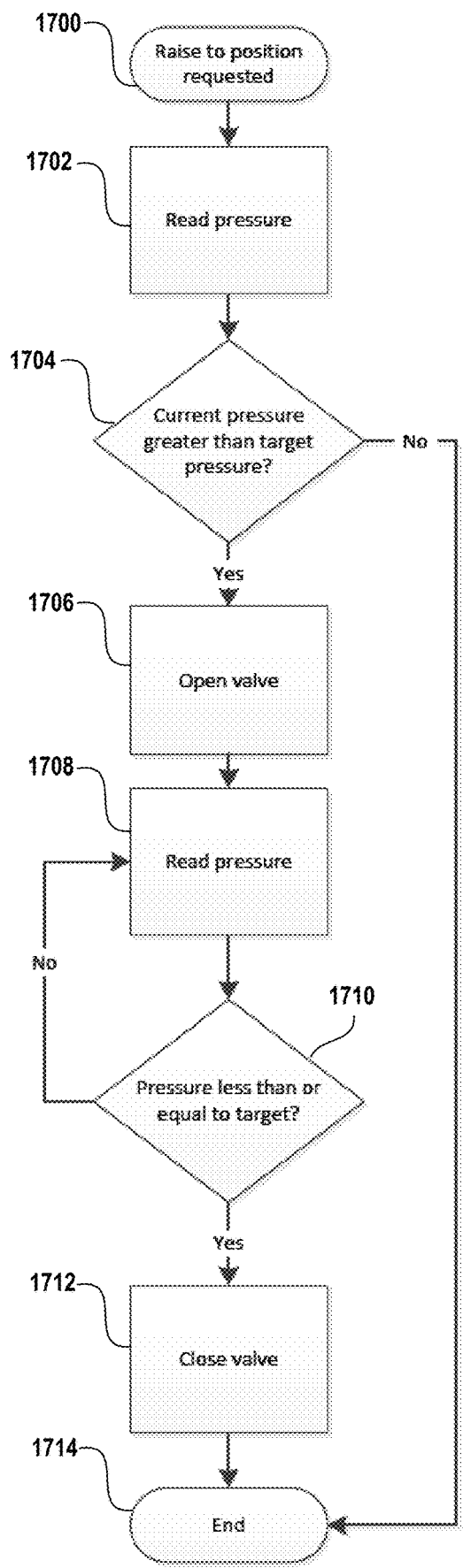
FIG. 17 is a flowchart of an embodiment of a method for raising the saddle of the seat post assembly FIG. 5 or FIG. 7 to a predetermined position.

FIG. 17 shows a flowchart of another embodiment of a method for raising a saddle of a bicycle (e.g., the saddle 106 of the bicycle 100). The method may be performed using the embodiment of the seat post assembly 124 shown in FIGS. 5 and 6, the embodiment of the seat post assembly 124 shown in FIGS. 7 and 8, or another seat post assembly 124. The method is implemented in the order shown, but other orders may be used. Additional, different, or fewer acts may be provided. Similar methods may be used for raising a saddle of a bicycle. The seat post enters the raise to position mode, for example, as the result of user input at the user interface.

In act 1700, the processor receives the request for the saddle height. The processor determines a pressure (e.g., a target pressure) that corresponds to the requested saddle height. In act 1702, the processor identifies a current pressure (e.g., at a first time point) from the pressure sensor or the memory and in act 1704, compares the identified current pressure to the target pressure. Based on the comparison, if the current pressure is greater than the target pressure, the method moves to act 1706. If the current pressure is not greater than the target pressure (e.g., is less than or equal to the target pressure), the method moves to the end of the method at act 1714.

In act 1706, the processor instructs a valve (e.g., the valve 180) of the seat post assembly to open, and in act 1708, the processor again identifies the current pressure (e.g., updates the current pressure at a second time point). In act 1710, the processor compares the updated current pressure to the target pressure. If the updated current pressure is less than the target pressure, the method moves to act 1712. If the updated current pressure is not less than the target pressure (e.g., is greater than or equal to the target pressure), then the method returns to act 1708. In act 1712, the processor instructs the valve (e.g., the valve 180) to close. The method ends at act 1714.

Figure 18:
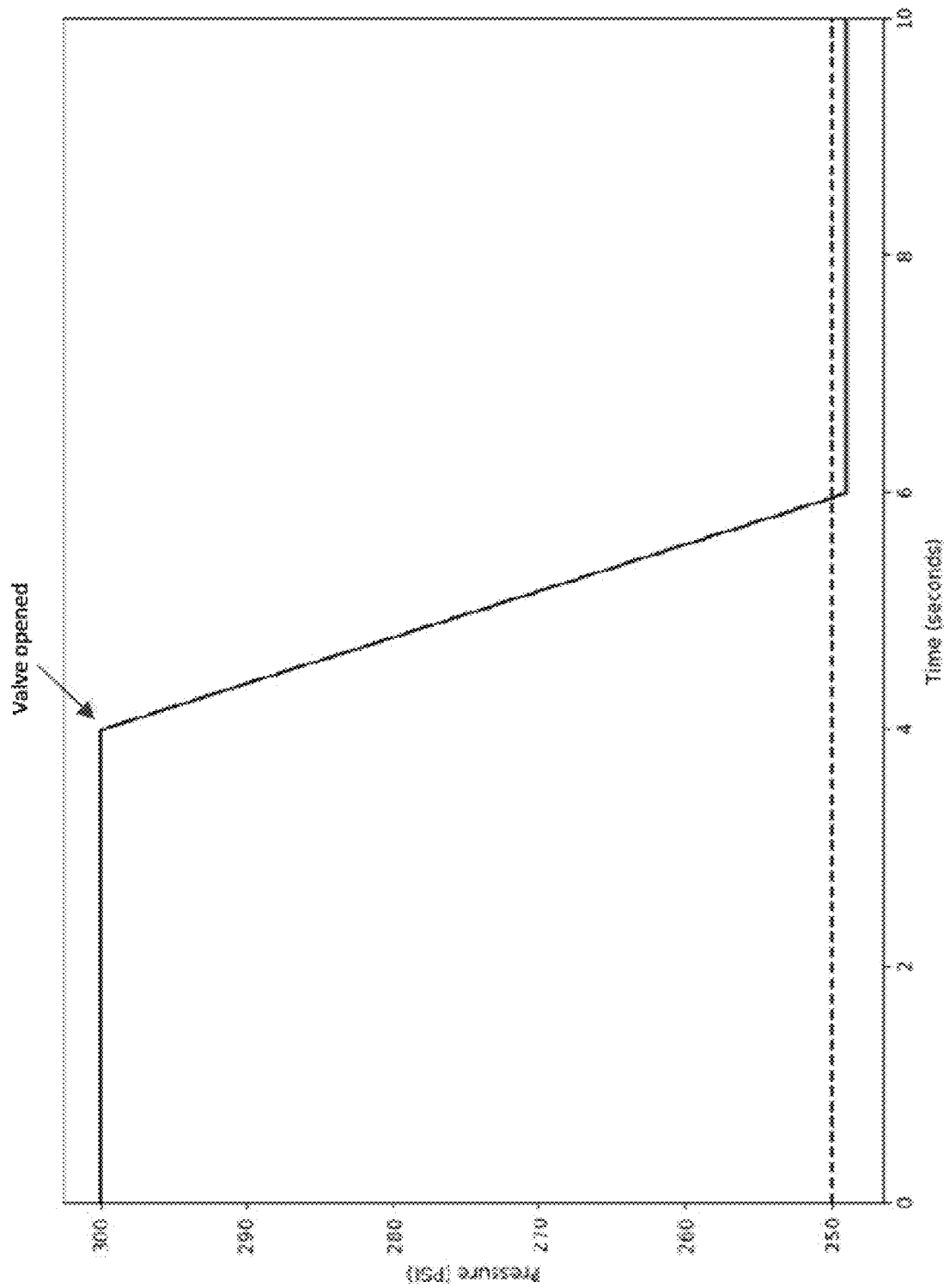
FIG. 18 shows an exemplary graph of seat post internal pressure versus time during the method of FIG. 16 or the method of FIG. 17.

FIG. 18 shows a representative graph of the pressure decreasing from the time the valve is opened (e.g., in act 1604 or act 1706) until the target pressure is reached and the valve is closed (e.g., in act 1612 or act 1712). In one embodiment, if the updated current pressure is at or beyond the target pressure (e.g., within a predetermined threshold) when the raise to position mode is entered, the valve does not open, and the current position of the saddle is maintained.

Figure 19:
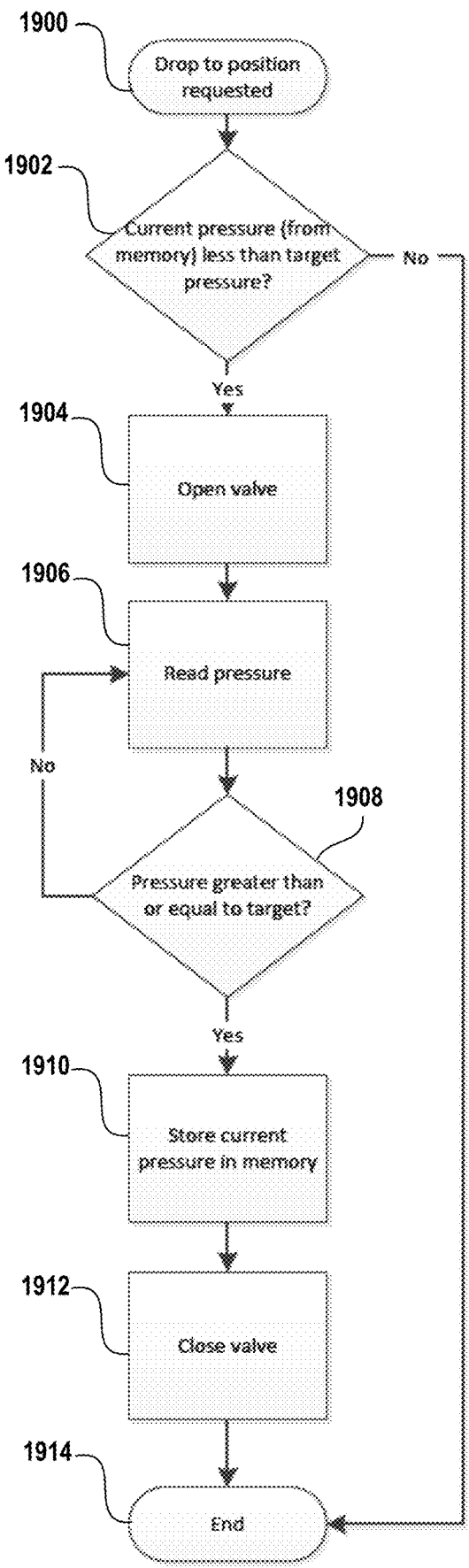
FIG. 19 is a flowchart of an embodiment of a method for dropping the saddle of the seat post assembly of FIG. 3 to a predetermined position.

FIG. 19 shows a flowchart of one embodiment of a method for lowering a saddle of a bicycle (e.g., the saddle 106 of the bicycle 100). The method may be performed using the embodiment of the seat post assembly 124 shown in FIGS. 3 and 4 or another seat post assembly. The method is implemented in the order shown, but other orders may be used. Additional, different, or fewer acts may be provided. Similar methods may be used for lowering a saddle of a bicycle.

The seat post assembly enters a mode in which the valve opens and remains open until the seat post (e.g., including the saddle) is dropped such that pressure equals or exceeds a pressure corresponding to a predetermined position (e.g., a drop to position mode). The predetermined position is typically between the maximum extended position and the minimum extended position. The mode is entered by, for example, a rider selecting the mode via a user interface at a bicycle (e.g., by lowering the saddle height at the user interface). The user interacts with the user interface (e.g., one or more buttons) to select a position of the saddle of the bicycle between the minimum extended position and the maximum extended position, for example. The user may interact with a button of the user interface to lower the saddle a predetermined amount (e.g., corresponding to a predetermined pressure change) and/or to select a predetermined saddle height or a historical saddle height that is, for example, stored in the memory of the electronics module of the seat assembly (e.g., corresponding to a predetermined pressure).

In one embodiment, the user interacts with a single button of the user interface. For example, the user presses and releases the single button to ratchet the saddle down by a predetermined height interval or to drop the saddle a predetermined amount (e.g., to halfway between the minimum extended position and the maximum extended position). As another example, the user presses and holds the single button, such that the valve is open while the single button is held; the valve closes when the button is released. The user interface may generate a signal (e.g., a request) corresponding to a requested saddle height based on the user interaction with the user interface.

In act 1900, the processor receives the request for the saddle height. The processor determines a pressure (e.g., a target pressure) that corresponds to the requested saddle height based on, for example, the data (e.g., the chart) stored in the memory. In one embodiment, if the requested saddle height does not exactly match one of the predetermined seat heights stored in the memory, the processor may determine the pressure corresponding to the requested saddle height by interpolating the data stored in the memory.

In act 1902, the processor identifies a current pressure (e.g., at a first time point) and compares the identified current pressure to the target pressure. The processor identifies the current pressure from the pressure sensor of the electronics module. Alternatively, the pressure sensor sends pressure measurements to the memory, and the processor identifies the current pressure from the memory. In one embodiment, the pressure sensor determines the pressure at a predetermined interval or determines the pressure continuously.

Based on the comparison, if the current pressure is less than the target pressure, the method moves to act 1904. If the current pressure is not less than the target pressure (e.g., is greater than or equal to the target pressure), the method moves to the end of the method at act 1914.

In act 1904, the processor instructs a valve (e.g., the valve 180) of the seat post assembly to open, and in act 1906, the processor again identifies the current pressure (e.g., updates the current pressure at a second time point). In act 1908, the processor compares the updated current pressure to the target pressure. If the updated current pressure is greater than the target pressure, the method moves to act 1910. If the updated current pressure is not less than the target pressure (e.g., is less than or equal to the target pressure), then the method returns to act 1906. The pressure may be increased by, for example, a rider using a hand to press down on the saddle or by the rider sitting on the saddle.

In act 1910, the updated current pressure is stored in the memory, and in act 1912, the processor instructs the valve (e.g., the valve 180) to close. The method ends at act 1914.

Figure 20:
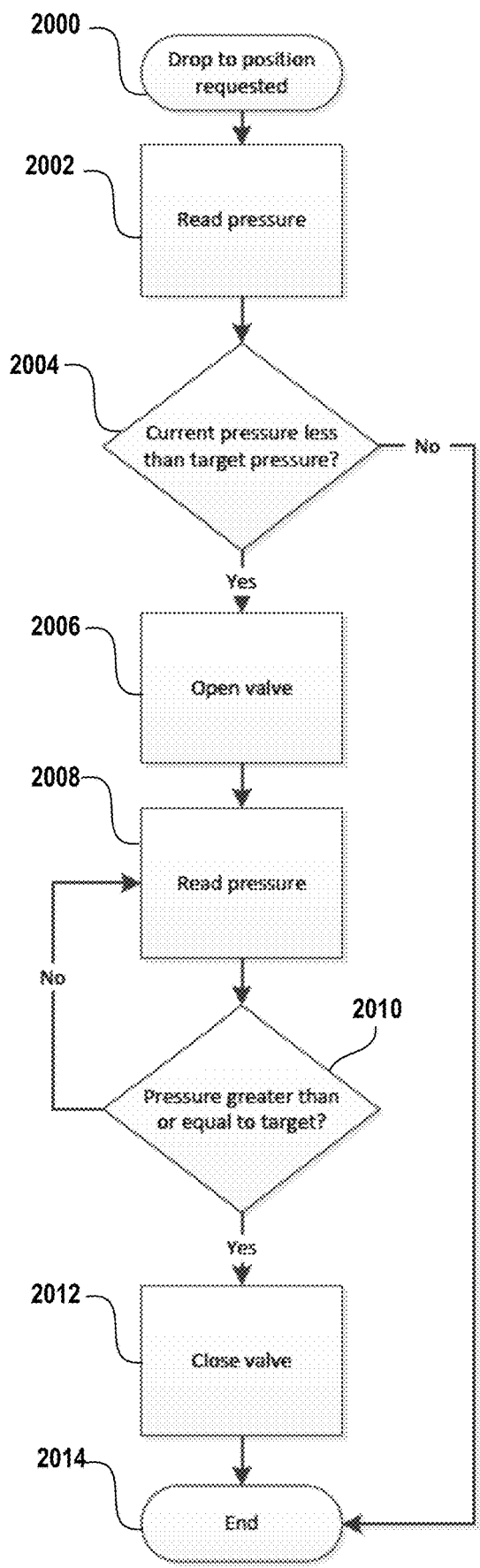
FIG. 20 is a flowchart of an embodiment of a method for dropping the saddle of the seat post assembly of FIG. 5 or FIG. 7 to a predetermined position.

FIG. 20 shows a flowchart of one embodiment of a method for lowering a saddle of a bicycle (e.g., the saddle 106 of the bicycle 100). The method may be performed using the embodiment of the seat post assembly 124 shown in FIGS. 5 and 6, the embodiment of the seat post assembly 124 shown in FIGS. 7 and 8, or another seat post assembly. The method is implemented in the order shown, but other orders may be used. Additional, different, or fewer acts may be provided. Similar methods may be used for lowering a saddle of a bicycle. The seat post enters the drop to position mode as the result of, for example, user input at the user interface.

In act 2000, the processor receives the request for the saddle height. The processor determines a pressure (e.g., a target pressure) that corresponds to the requested saddle height. In act 2002, the processor identifies a current pressure (e.g., at a first time point) from the pressure sensor or the memory and in act 2004, compares the identified current pressure to the target pressure. Based on the comparison, if the current pressure is less than the target pressure, the method moves to act 2006. If the current pressure is not less than the target pressure (e.g., is greater than or equal to the target pressure), the method moves to the end of the method at act 2014.

In act 2006, the processor instructs a valve (e.g., the valve 180) of the seat post assembly to open, and in act 2008, the processor again identifies the current pressure (e.g., updates the current pressure at a second time point). In act 2010, the processor compares the updated current pressure to the target pressure. If the updated current pressure is greater than the target pressure, the method moves to act 2012. If the updated current pressure is not greater than the target pressure (e.g., is less than or equal to the target pressure), then the method returns to act 2008. In act 2012, the processor instructs the valve (e.g., the valve 180) to close. The method ends at act 2014.

Figure 21:
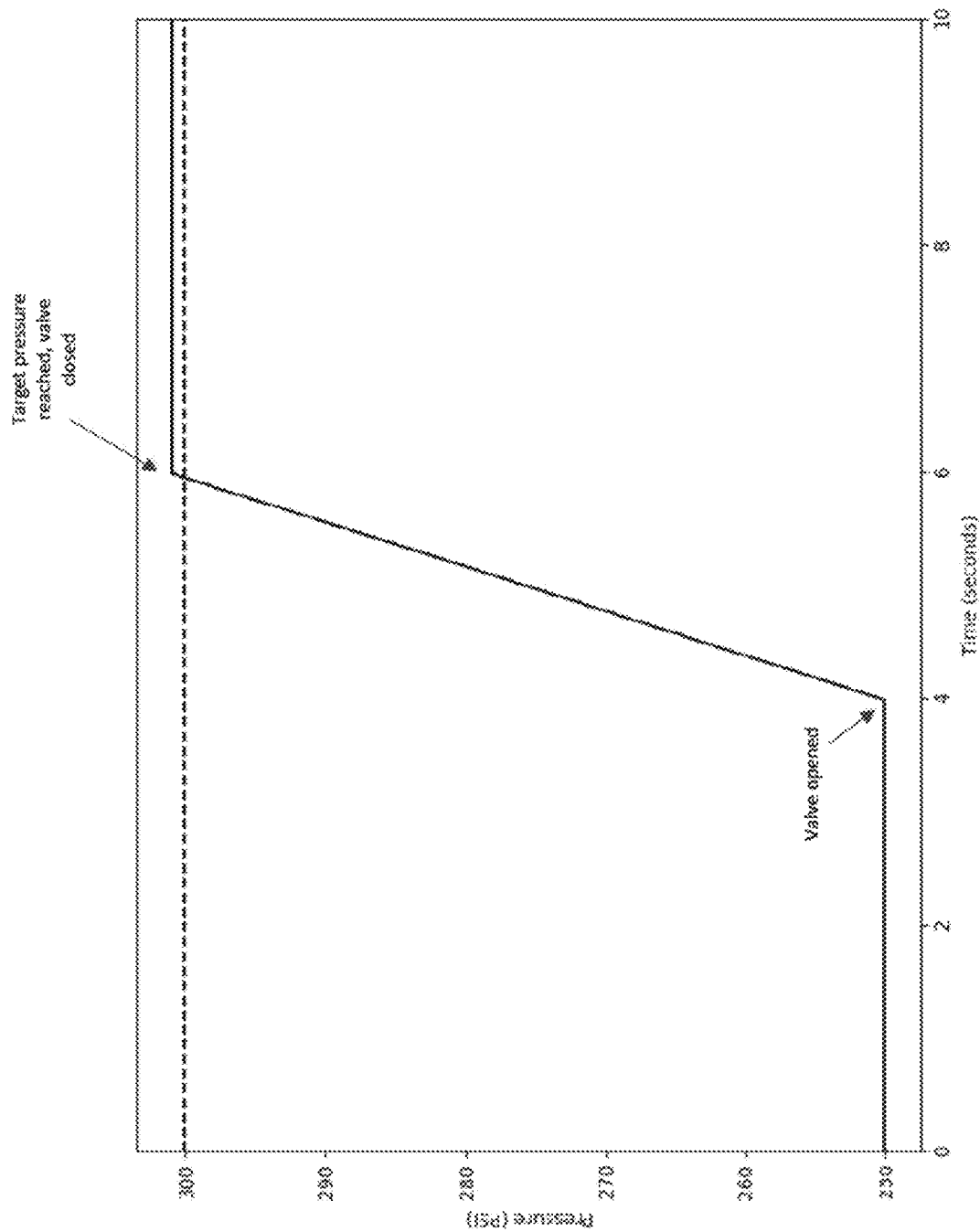
FIG. 21 shows an exemplary graph of seat post internal pressure versus time during the method of FIG. 19 or the method of FIG. 20.

FIG. 21 shows a representative graph of the pressure increasing from the time the valve is opened (e.g., in act 1904 or act 2006) until the target pressure is reached and the valve is closed (e.g., in act 1912 or act 2012). In one embodiment, if the pressure is at or beyond the target (e.g., within a predetermined threshold) when the drop to position mode is entered, the valve does not open and the current position of the saddle is maintained.

Figure 22:
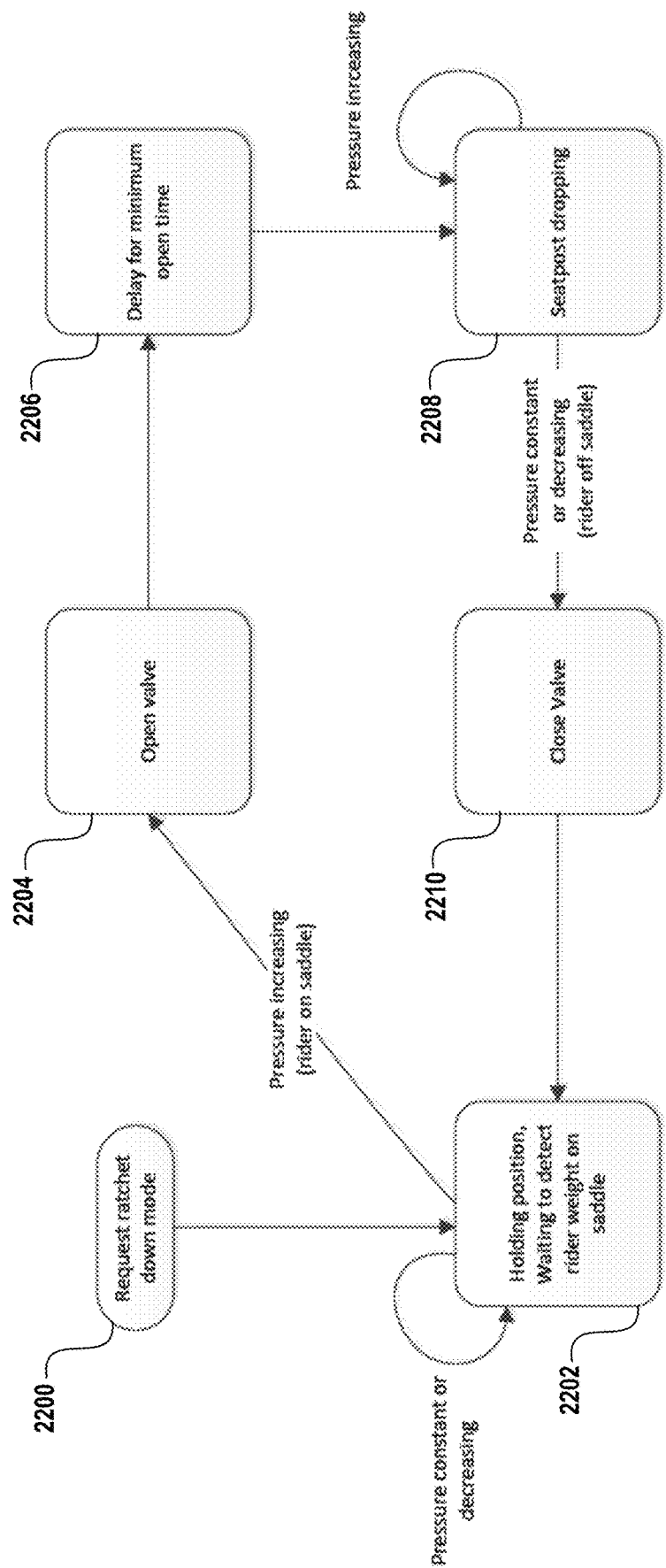
FIG. 22 is a flowchart of an embodiment of a method for controlling internal pressure for the seat post assembly of FIG. 3 or the seat post assembly of FIG. 5 when a user applies pressure to the seat post assembly.

FIG. 22 shows a flowchart of one embodiment of a method for a ratchet mode for a saddle of a bicycle (e.g., the saddle 106 of the bicycle 100). The method may be performed using the embodiment of the seat post assembly 124 shown in FIGS. 3 and 4, the embodiment of the seat post assembly 124 shown in FIGS. 5 and 6 or another seat post assembly. The seat post assembly enters a mode in which the processor opens the valve (e.g., the valve 180) any time the pressure begins increasing (e.g., the ratchet mode), which is an indication that the rider is sitting on the saddle. The ratchet mode may be entered due to, for example, a change in riding terrain or conditions. For example, the ratchet mode may be entered when a rider transitions from a downhill to an uphill.

The valve will remain open as long as the pressure continues to monotonically increase indicating that the post is actively being compressed. If the pressure stops increasing, the processor immediately closes the valve, preventing the saddle from extending. While in this mode, the valve may open any number of times allowing the seat post to be incrementally compressed.

In act 2200, the processor receives a request from the user interface, based on, for example, user input, requesting the ratchet mode be entered. The ratchet mode may be requested specifically by the rider of the bicycle. Alternatively, the processor may determine, based on detected pressure, that the rider is sitting on the saddle (e.g., in act 2202), and the processor may automatically enter the ratchet mode.

In act 2202, the processor determines whether the rider is applying at least a predetermined pressure on the saddle of the seat post assembly. For example, the processor identifies the current pressure from the pressure sensor or the memory at a predetermined interval or continuously. The processor compares the current pressure to a predetermined threshold pressure (e.g., at and above which is indicative the rider is sitting on the saddle), and when the current pressure is, for example, greater than the predetermined threshold pressure, the processor enters the ratchet mode and moves to act 2204.

In act 2204, the processor opens the valve (e.g., the valve 180), and in act 2206, the processor waits a predetermined open time (e.g., 50, 100, or 200 milliseconds). In one embodiment, the method does not include act 2206, and there is no time delay between act 2204 and act 2208.

In act 2208, the processor monitors the identified current pressure, which is updated at the predetermined interval or continuously. Each updated current pressure may be stored in the memory, at least for a predetermined period of time (e.g., thirty seconds). In one embodiment, at a predetermined monitoring interval, the processor compares the identified current pressure to the most recent previously stored pressure. If the identified current pressure is greater than the most recent previously stored pressure, this is an indication that with the valve open, the saddle is dropping, and the valve remains open. If the identified current pressure is less than or equal to the most recent previously stored pressure, the method moves to act 2210.

In act 2210, the processor closes the valve. The method then moves back to act 2202, in which the processor monitors the pressure on the saddle via the pressure sensor.

Figure 23:
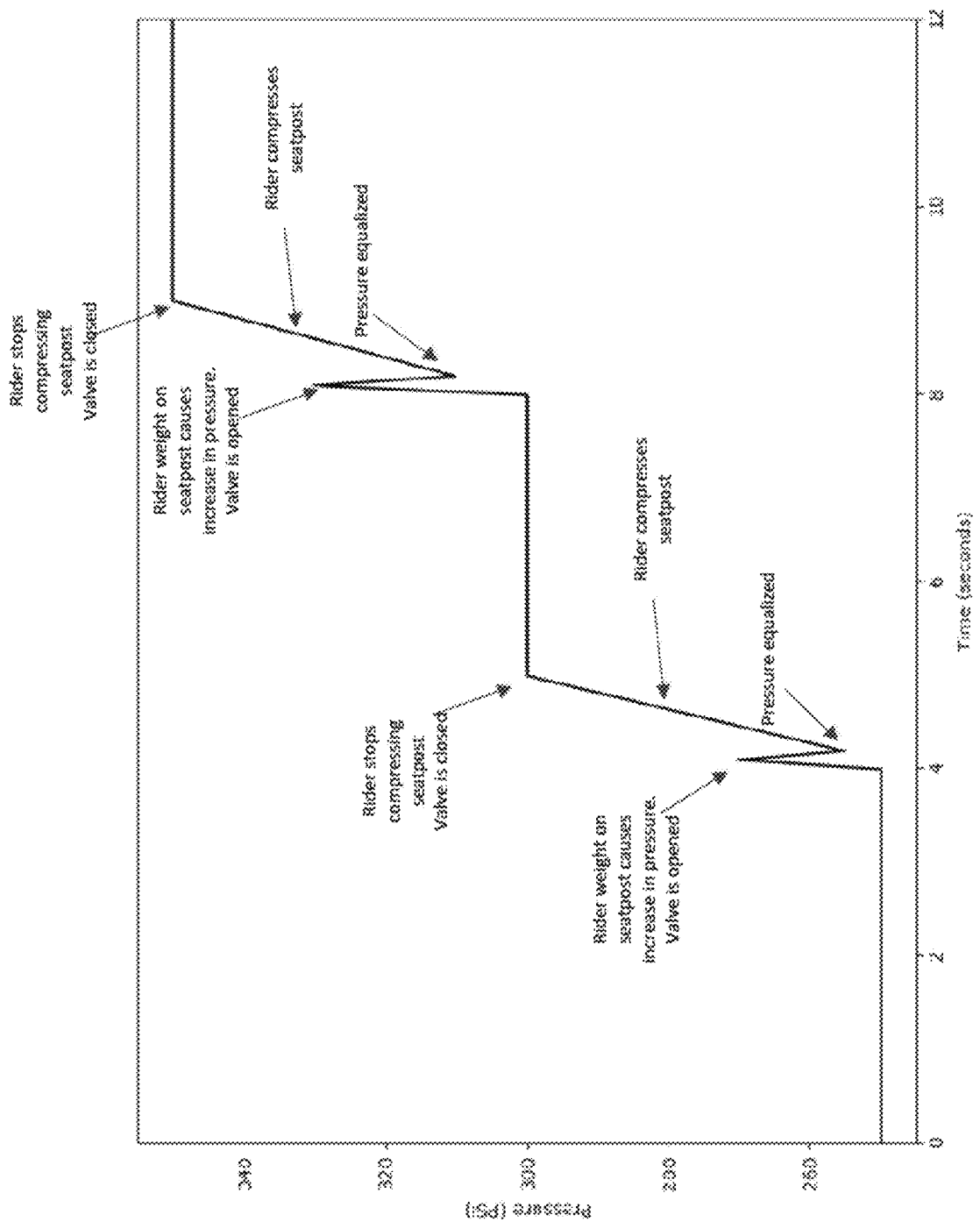
FIG. 23 shows an exemplary graph of seat post internal pressure versus time during the method of FIG. 22.

FIG. 23 shows a representative graph of the pressure over two cycles of valve opening, seat post compressing, and valve closing.

Figure 24:
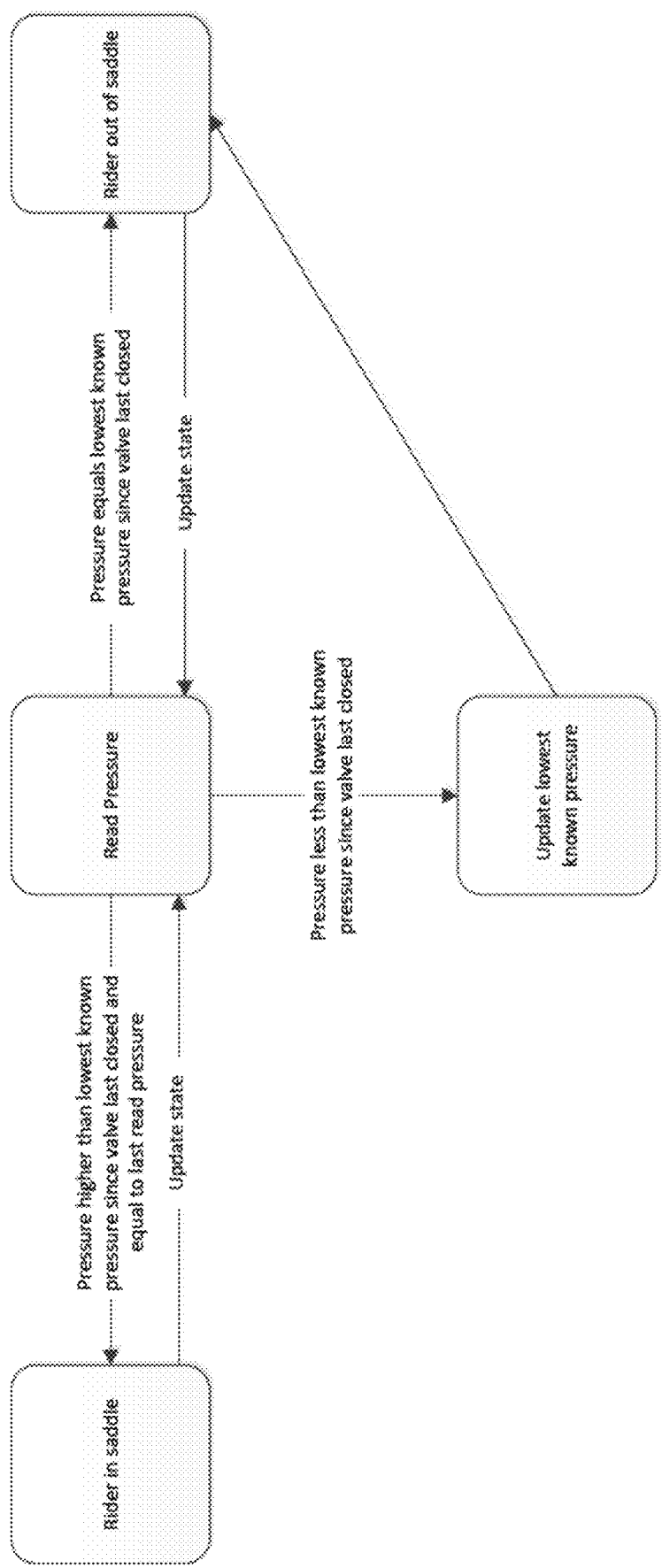
FIG. 24 is a flowchart of an embodiment of a method for determining whether a user is seated on the saddle of the seat post assembly of FIG. 3 or the seat post assembly of FIG. 5.

Referring to FIG. 24, with the seat post assembly in a state where the valve (e.g., the valve 180) is closed, the pressure sensor may take periodic pressure readings and use this data to determine if the rider is seated on the saddle (e.g., saddle detection mode). With the valve closed, the processor may observe a minimum pressure that corresponds to the rider being off the saddle. For any pressure above the minimum pressure or above a predetermined threshold value above the minimum pressure, the processor may infer that the rider is sitting on the saddle. From the time the valve is closed, there is no way to certify that the minimum pressure has actually been observed, so the minimum pressure is updated every time a new pressure sample is less than the current minimum pressure. The null hypothesis of the minimum pressure is the first pressure sample after the valve has closed. The detection of the rider on the saddle (e.g., within saddle detection mode) may be used as an input to other control algorithms on the bicycle such as setting suspension damping rates.

In one embodiment, only one of the methods described above with reference to FIGS. 16-24 is executed at a time. In another embodiment, more than one of the methods described above with reference to FIGS. 16-24 are executed in parallel. For example, the raise to position mode is executed in parallel with the saddle detection mode. Additional and/or different modes may be executed in parallel.

Figure 25:
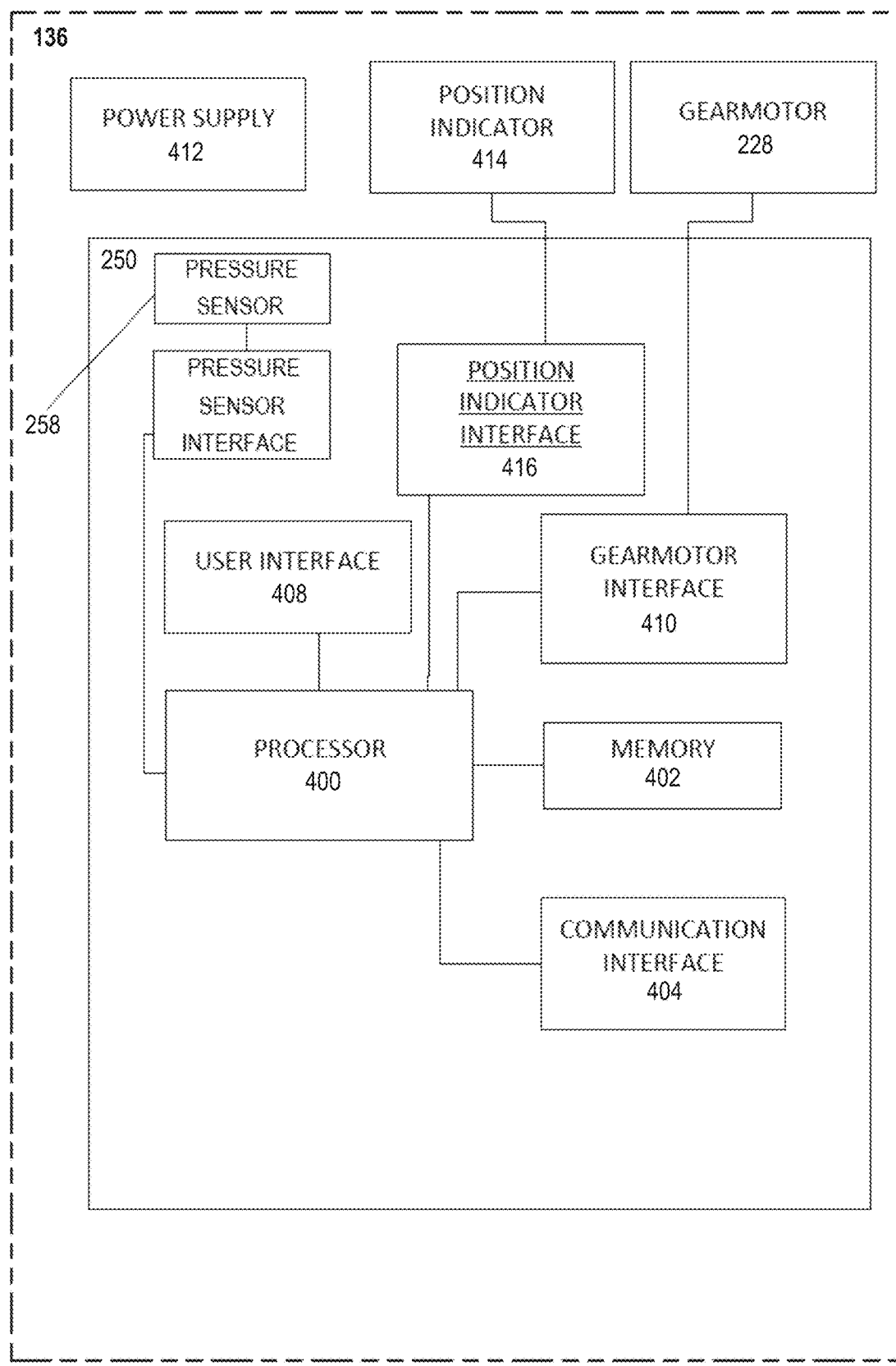
FIG. 25 shows a block diagram of an electronic portion of one embodiment of a seat post assembly.

A block diagram illustrating the components of the electronics module 136 is shown in FIG. 25. The PCB 250 includes a processor 400, a memory 402, and a communication interface 404. The PCB 250 may also include or be communicatively coupled to a wake-up sensor 406, a user interface 408, a position indicator interface, and/or a gearmotor interface 410. The processor 400 also refers to the microprocessor as described herein, and may include a general processor, digital signal processor, an application specific integrated circuit (ASIC), field programmable gate array (FPGA), analog circuit, digital circuit, combinations thereof, or other now known or later developed processor. The processor 400 may be a single device or combinations of devices, such as through shared or parallel processing.

The memory 402 may be a volatile memory or a non-volatile memory. The memory 402 may include one or more of a read only memory (ROM), random access memory (RAM), a flash memory, an electronic erasable program read only memory (EEPROM), or other type of memory. The memory 402 may be removable from the electronics module 136, such as a secure digital (SD) memory card. In a particular non-limiting, exemplary embodiment, a computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device. Accordingly, the disclosure is considered to include any one or more of a computer-readable medium and other equivalents and successor media, in which data or instructions may be stored. The memory is used to store instructions for the processor 400.

The memory 402 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

The electronics module 136 also includes a power supply 412. The power supply 412 may be a portable power supply, such as the battery described as part of embodiments described herein. The power supply 412 may involve the generation of electric power using, for example, a mechanical power generator, a fuel cell device, photo-voltaic cells, or other power generating devices. The power supply 412 may include a battery such as a device consisting of two or more electrochemical cells that convert stored chemical energy into electrical energy. The power supply 412 may include one battery or a combination of multiple batteries or other power providing devices. Specially fitted or configured battery types, or standard battery types such as CR 2012, CR 2016, and/or CR 2032 may be used.

The communication interface 404 provides for data and/or signal communication from the electronics module 136 to another component of the bicycle 100, such as one or more wireless actuators, or an external device such as a mobile phone or other computing device. For example, the communication interface 404 may provide for communication of rider data (e.g., whether the rider is on the saddle, based on pressure readings when the valve 180 is in the closed position) from the electronics module 136 to another electronics module on the bicycle 100 for controlling a component of the bicycle 100 such as, for example, a derailleur or a suspension component. The communication interface 404 communicates the data using any operable connection. An operable connection may be one in which signals, physical communications, and/or logical communications may be sent and/or received. An operable connection may include a physical interface, an electrical interface, and/or a data interface. The communication interface 404 is configured to communicate wirelessly and as such, includes one or more antennae or radio device. The communication interface 404 provides for wireless communications in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth®, ANT+™, ZigBee, WiFi, and/or AIREA™ standards may also, or alternatively, be used. Accordingly, replacement standards and protocols having the same or similar functions as those disclosed herein are considered equivalents thereof. In an embodiment, the communication interface 404 may be configured to transmit a signal indicative of a load state of a saddle or a current mode of operation for the seat post assembly. Other signals may be transmitted. For example, the communication interface 404 may be configured to transmit a signal indicative of a determined and/or detected pedaling state of a bicycle drivetrain. Further, the determined pedaling state may be transmitted wirelessly.

The gearmotor interface 410 provides for data and/or signal communication from the gearmotor 228 to the circuitry of the PCB 250. The gearmotor interface 410 communicates using wired techniques. For example, the gearmotor interface 410 communicates with the gearmotor 228 using a system bus, or other communication technique. The gearmotor interface 410 may include additional electric and/or electronic components, such as an additional processor and/or memory for detecting, communicating, and/or otherwise processing signals of the gearmotor 228. In an embodiment, a dedicated and distinct gearmotor interface 410 may not be used, but the processor 400 may be configured to control, read, and/or process the gearmotor signals, thus integrating the gearmotor interface 410 with the processor 400 in whole or in part.

The electronics module 136 may also include a position indicator 414 of the gearmotor 228 or gearing coupled thereto, such as the optical switch 252 described herein. A position indicator interface 416 provides for data and/or signal communication from the position indicator 414 to the circuitry of the PCB 250. The position indicator interface 416 communicates using wired techniques. For example, the position indicator interface 416 communicates with the position indicator 414 using a system bus, or other communication technique. The position indicator interface 416 may include additional electric and/or electronic components, such as an additional processor and/or memory for detecting, communicating, and/or otherwise processing signals of the position indicator 414. In an embodiment, a dedicated and distinct position indicator interface 416 may not be used, but the processor 400 may be configured to control, read, and/or process the gearmotor signals, thus integrating the position indicator interface 416 with the processor 400 in whole or in part.

The user interface 408 may be one or more buttons, lights, or other device or component for communicating data between a user and the electronics module 136. The user interface 408 may include a liquid crystal display ("LCD") panel, light emitting diode ("LED"), LED screen, thin film transistor screen, or another type of display or light emitting devices. The user interface 408 may also include audio capabilities, or speakers.

In an embodiment, the user interface 408 includes an LED indicator. The LED indicator lights to indicate input of the commands or other actions of the electronics module 136, for example.

The electronics module 136 also includes at least one pressure sensor 258. A pressure sensor interface provides for data and/or signal communication from the at least one pressure sensor 258 and/or the pressure sensor 280 to the circuitry of the PCB 250. The pressure sensor interface communicates using wired techniques. For example, the pressure sensor interface communicates with the at least one pressure sensor 258 and/or the pressure sensor 280 using a system bus, or other communication technique. In one embodiment, the pressure sensor interface communicates with one or more of the pressure sensors 1 and/or the pressure sensor 280 via wireless techniques. The pressure sensor interface may include additional electric and/or electronic components, such as an additional processor and/or memory for detecting, communicating, and/or otherwise processing signals of the at least one pressure sensor 258 and/or the pressure sensor 280. In an embodiment, a dedicated and distinct pressure sensor interface may not be used, but the processor 400 may be configured to control, read, and/or process the pressure sensor signals, thus integrating the pressure sensor interface with the processor 400 in whole or in part.

In accordance with various embodiments of the present disclosure, methods described herein may be implemented with software programs executable by a computer system, such as the circuitry included on the PCB 250. Further, in an exemplary, non-limited embodiment, implementations may include distributed processing, component/object distributed processing, and parallel processing. Alternatively, virtual computer system processing can be constructed to implement one or more of the methods or functionality as described herein.

A computer program (also known as a program, software, software application, script, or code) may be written in any form of programming language, including compiled or interpreted languages, and the computer program may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by and the electronics module 136 may also be implemented as special purpose logic circuitry (e.g., a field programmable gate array (FPGA) or an application specific integrated circuit (ASIC)).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes or is operatively coupled to receive data from or transfer data to, or both, one or more mass storage devices for storing data (e.g., magnetic, magneto optical disks, or optical disks). However, a computer need not have such devices. A computer may be embedded in another device (e.g., a mobile telephone, a personal digital assistant (PDA), a mobile audio player, a Global Positioning System (GPS) receiver, or another apparatus). Computer readable media suitable for storing computer program instructions and data include all forms of non-volatile memory, media and memory devices, including by way of example semiconductor memory devices (e.g., EPROM, EEPROM, and flash memory devices; magnetic disks such as internal hard disks or removable disks; magneto optical disks; and CD ROM and DVD-ROM disks). The processor and the memory may be supplemented by, or incorporated in, special purpose logic circuitry.

Other examples of the rider interface, pairing procedure, wireless signal transmission and receiving, and the like are possible within the spirit and scope of the present disclosure. In the above-described example, the rider presses and holds an actuator or button on a wireless actuator to adjust the saddle position, and releases the actuator or button to achieve and maintain the selected position. In one alternative example, the rider may press and release an actuator or button to adjust the vertical position of the saddle and may again press and release the same actuator or button to then hold and maintain a selected saddle position. In another example, the rider may press and release a first actuator to adjust the saddle position and may then press and release a second different actuator to hold and maintain the selected saddle position. In yet another example, the rider may use the actuator or button to select predetermined saddle positions stored in the memory 402. In another example, the rider may press and release the actuator to enter the ratchet mode and may press and hold the actuator for at least a predetermined amount of time to enter a standard mode, during which the valve 180 is moved to the open position when the actuator is pressed and released.

Other aspects, features, and components of the disclosed seat post assembly may also be modified within the spirit and scope of the present disclosure. In one example, the electronics module may include hard stops on one or more of the parts to limit the rotations travel of the cam and/or motor. In one example, the motor support bracket and cam may each include a hard stop element.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A seat post assembly for a bicycle, the seat post assembly comprising:
   a first tube having a first distal end;

a second tube having a second distal end, the first tube and the second tube being movable relative to one another to establish a distance between the first distal end of the first tube and the second distal end of the second tube along a tube axis;

a first chamber, a second chamber, and a flow path connecting the first chamber and the second chamber;

a valve including an isolator, the isolator being configured to move between a closed position closing the flow path and an open position opening the flow path between the first chamber and the second chamber, the relative movement between the first tube and the second tube being prevented when the isolator is in the closed position and the relative movement between the first tube and the second tube being allowed when the isolator is in the open position;

a third chamber outside of the flow path;

a pressure sensor configured to measure a pressure of a fluid within the first chamber or the second chamber;

a controller in communication with the pressure sensor and the valve, the controller being configured to control the movement of the isolator between the closed position and the open position based on the measured pressure; and a piston cylinder disposed within the first tube, the piston cylinder partially defining the first chamber, wherein at least a portion of the second chamber and at least a portion of the third chamber are disposed within a volume between the piston cylinder and the first tube, a piston separating the second chamber and the third chamber within the volume between the piston cylinder and the first tube, an incompressible fluid is disposed within the first chamber and the second chamber, and a compressible gas is disposed within the third chamber, and wherein the pressure sensor is configured to measure the pressure of the incompressible fluid within the first chamber or the pressure of the incompressible fluid within the second chamber.

2. The seat post assembly of claim 1, wherein the pressure sensor is configured to measure the pressure of the incompressible fluid within the first chamber.

3. The seat post assembly of claim 1, wherein the compressible gas has a preloaded pressure, such that when the distance between the first distal end of the first tube and the second distal end of the second tube along the tube axis is at a minimum and the isolator is moved from the closed position to the open position, the preloaded pressure causes the relative movement between the first tube and the second tube.

4. The seat post assembly of claim 1, wherein the measured pressure is proportional to a load applied along the tube axis when the isolator is in the closed position and is proportional to the distance between the first distal end of the first tube and the second distal end of the second tube along the tube axis when the isolator is in the open position.

5. The seat post assembly of claim 4, wherein the controller is further configured to:

identify a target distance between the first distal end of the first tube and the second distal end of the second tube along the tube axis;

determine a target pressure based on the identified target distance; and in a first mode, when the measured pressure is greater than the determined target pressure:

instruct the isolator to move to the open position;

read the pressure of the fluid from the pressure sensor at least until the read pressure is less than or equal to the determined target pressure; and instruct the isolator to move to the closed position when the read pressure is less than or equal to the determined target pressure.

6. The seat post assembly of claim 5, wherein the controller is further configured to:

in a second mode, when the measured pressure is less than the determined target pressure:

instruct the isolator to move to the open position;

read the pressure of the fluid from the pressure sensor at least until the read pressure is greater than or equal to the determined target pressure; and instruct the isolator to move to the closed position when the read pressure is greater than or equal to the determined target pressure.

7. The seat post assembly of claim 4, wherein when the isolator is in the closed position, the pressure sensor is configured to measure the pressure of the fluid within the first chamber or the second chamber a number of times; and for each of the number of times, the controller is further configured to:

compare the respective measured pressure to a threshold pressure; and generate rider data based on the comparison of the respective measured pressure to the threshold pressure, the rider data identifying a rider is on a seat of the seat post assembly.

8. The seat post assembly of claim 4, wherein the pressure sensor is configured to measure the pressure of the fluid at a number of time points, and wherein the controller is further configured to:

compare a first pressure of the measured pressures of the fluid to a second pressure of the measured pressures of the fluid, the first pressure and the second pressure being measured at first successive time points of the number of time points, respectively, the second pressure being measured after the first pressure;

instruct the isolator to move to the open position when the second pressure is greater than the first pressure;

compare a third pressure of the measured pressures of the fluid to a fourth pressure of the measured pressures of the fluid, the third pressure and the fourth pressure being measured at second successive time points of the number of time points, respectively, the fourth pressure being measured after the third pressure and the second pressure; and instruct the isolator to move to the closed position when the fourth pressure is less than the third pressure.

9. The seat post assembly of claim 8, wherein the controller is further configured to:

compare a fifth pressure of the measured pressures of the fluid to a sixth pressure of the measured pressures of the fluid, the fifth pressure and the sixth pressure being measured at third successive time points of the number of time points, respectively, the sixth pressure being measured after the fifth pressure and the fifth pressure being measured after the fourth pressure;

instruct the isolator to move to the open position when the sixth pressure is greater than the fifth pressure;

compare a seventh pressure of the measured pressures of the fluid to an eighth pressure of the measured pressures of the fluid, the seventh pressure and the eighth pressure being measured at fourth successive time points of the number of time points, respectively, the eighth pressure being measured after the seventh pressure and the sixth pressure; and instruct the isolator to move to the closed position when the eighth pressure is less than the seventh pressure.

10. The seat post assembly of claim 8, further comprising a memory in communication with the controller, the memory being configured to store the measured pressures at the first time point, the second time point, the third time point, and the fourth time point, respectively.

11. The seat post assembly of claim 8, wherein a time period between the first successive time points and the second successive time points is greater than or equal to a predetermined minimum isolator open time period.

12. The seat post assembly of claim 8, wherein the controller is further configured to enter a mode of operation of the seat post assembly based on a user input, wherein the mode is a ratchet mode that includes the comparison of the first pressure to the second pressure, the instruction of the isolator to move to the open position, the comparison of the third pressure to the fourth pressure, and the instruction of the isolator to move to the closed position when the user input is a first user input, and wherein the mode is a standard mode when the user input is a second user input, the standard mode including the controller being further configured to move the isolator to the open position in response to the second user input.

13. The seat post assembly of claim 12, wherein the controller is further configured to:

receive first data identifying the first user input or second data identifying the second user input; and enter the ratchet mode when the controller receives the first data and enter the standard mode when the controller receives the second data, and wherein the first data identifies a user pressing and releasing a user interface, and the second data identifies the user pressing and holding the user interface for at least a predetermined amount of time.

14. A seat post assembly for a bicycle, the seat post assembly comprising:

a first tube having a first distal end;

a second tube having a second distal end, the first tube and the second tube being movable relative to one another to establish a distance between the first distal end of the first tube and the second distal end of the second tube along a tube axis;

a first chamber, a second chamber, and a flow path connecting the first chamber and the second chamber;

a valve including an isolator, the isolator being configured to move between a closed position closing the flow path and an open position opening the flow path between the first chamber and the second chamber, the relative movement between the first tube and the second tube being prevented when the isolator is in the closed position and the relative movement between the first tube and the second tube being allowed when the isolator is in the open position;

a pressure sensor configured to measure a pressure of a fluid within the first chamber or the second chamber; and a controller in communication with the pressure sensor and the valve, the controller being configured to control the movement of the isolator between the closed position and the open position based on the measured pressure, wherein the pressure sensor is a first pressure sensor, and wherein the seat post assembly further comprises a second pressure sensor, the second pressure sensor being configured to measure the pressure of the fluid within a third chamber, the measured pressure of the fluid within the third chamber being proportional to the distance between the first distal end of the first tube and the second distal end of the second tube along the tube axis when the isolator is in the open position or when the isolator is in the closed position.

* * * * *